US012794522B2

(12) United States Patent
Park et al.

(10) Patent No.: US 12,794,522 B2
(45) **Date of Patent: *Nov. 10, 2026**

(54) TECHNIQUES FOR ESTIMATING MISALIGNMENT BETWEEN ANTENNA ARRAYS

(71) Applicant: QUALCOMM Incorporated, San Diego, CA (US)

(72) Inventors: Seyong Park, San Diego, CA (US); Pinar Sen, San Diego, CA (US); Renqiu Wang, San Diego, CA (US); Peter Gaal, San Diego, CA (US); Naga Bhushan, San Diego, CA (US); Krishna Kiran Mukkavilli, San Diego, CA (US); Muhammad Sayed Khairy Abdelghaffar, San Jose, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/810,339

(22) Filed: Aug. 20, 2024

(65) Prior Publication Data

US 2025/0055514 A1 Feb. 13, 2025

Related U.S. Application Data

(63) Continuation of application No. 18/156,690, filed on Jan. 19, 2023, now Pat. No. 12,068,814.

(51) Int. Cl.
*H04B 7/0456* (2017.01)
*H04B 7/06* (2006.01)

(52) U.S. Cl.
CPC .......... *H04B 7/0456* (2013.01); *H04B 7/063* (2013.01)

(58) Field of Classification Search
CPC .............................. H04B 7/0456; H04B 7/063
See application file for complete search history.

(56) References Cited

U.S. PATENT DOCUMENTS

| | | | | |
|---|---|---|---|---|
| 12,068,814 | B2 * | 8/2024 | Park | H04B 7/063 |
| 2018/0254839 | A1 * | 9/2018 | Yuan | H01Q 21/26 |

(Continued)

OTHER PUBLICATIONS

International Search Report and Written Opinion—PCT/US2024/010887—ISA/EPO—May 16, 2024.

*Primary Examiner* — Syed Haider
(74) *Attorney, Agent, or Firm* — QUALCOMM Incorporated

(57) ABSTRACT

Methods, systems, and devices for wireless communications are described. A first wireless device may be configured to transmit one or more reference signals to a second wireless device using a first antenna array at the first wireless device and in accordance with a first precoder matrix. The first wireless device may receive, from the second wireless device based on the one or more reference signals, a feedback message indicating an estimated rotational misalignment, an estimated spatial misalignment, or both, between the first antenna array at the first wireless device and a second antenna array at the second wireless device. The first wireless device may then transmit a message to the second wireless device in accordance with a second precoder matrix that is modified relative to the first precoder matrix based at least in part on the estimated rotational misalignment, the estimated spatial misalignment, or both.

30 Claims, 17 Drawing Sheets

(56) References Cited

U.S. PATENT DOCUMENTS

| | | | | |
|---|---|---|---|---|
| 2020/0212978 | A1 | 7/2020 | Zhao et al. | |
| 2022/0065987 | A1 | 3/2022 | Kondo et al. | |
| 2022/0279535 | A1* | 9/2022 | Tsui | G06N 20/00 |
| 2023/0031668 | A1* | 2/2023 | Aoki | H01Q 3/267 |

* cited by examiner

405

Received Phase – No Rotational Misalignment 410-a

Received Phase – Z Rotational Misalignment 410-b

400

505

Received Phase – Rotational Misalignment

510

500

TECHNIQUES FOR ESTIMATING MISALIGNMENT BETWEEN ANTENNA ARRAYS

CROSS REFERENCE

The present Application for Patent is a continuation of U.S. patent application Ser. No. 18/156,690 by PARK et al., entitled “TECHNIQUES FOR ESTIMATING MISALIGNMENT BETWEEN ANTENNA ARRAYS,” filed Jan. 19, 2023, assigned to the assignee hereof, and expressly incorporated by reference in its entirety herein.

FIELD OF TECHNOLOGY

The following relates to wireless communications, including techniques for estimating misalignment between antenna arrays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, wireless devices exchange signaling with one another using antenna arrays that may include many individual antenna elements. For example, a transmitting (Tx) device may transmit a signal to a receiving (Rx) device using a Tx antenna array, where the Rx device receives the signal using an Rx antenna array. However, the efficiency and reliability of communications between antenna arrays may be detrimentally impacted when the Tx and Rx antenna arrays are misaligned with one another.

SUMMARY

The described techniques relate to improved methods, systems, devices, and apparatuses that support techniques for estimating misalignment between antenna arrays. Generally, aspects of the present disclosure are directed to techniques for estimating misalignments between transmit (Tx) and receive (Rx) antenna arrays. In particular, techniques described herein may be used to estimate rotational and/or translational misalignments between antenna arrays, where estimated misalignments may be used to adjust precoding matrices and/or postprocessing matrices used for communications between the respective devices.

A method is described. The method may include transmitting one or more reference signals to a second wireless device using a first antenna array at the first wireless device and in accordance with a first precoder matrix, receiving, from the second wireless device based on the one or more reference signals, a feedback message indicating an estimated rotational misalignment, an estimated spatial misalignment, or both, between the first antenna array at the first wireless device and a second antenna array at the second wireless device, and transmitting a message to the second wireless device in accordance with a second precoder matrix that is modified relative to the first precoder matrix based on the estimated rotational misalignment, the estimated spatial misalignment, or both.

An apparatus is described. The apparatus may include a processor, memory coupled with the processor, and instructions stored in the memory. The instructions may be executable by the processor to cause the apparatus to transmit one or more reference signals to a second wireless device using a first antenna array at the first wireless device and in accordance with a first precoder matrix, receive, from the second wireless device based on the one or more reference signals, a feedback message indicating an estimated rotational misalignment, an estimated spatial misalignment, or both, between the first antenna array at the first wireless device and a second antenna array at the second wireless device, and transmit a message to the second wireless device in accordance with a second precoder matrix that is modified relative to the first precoder matrix based on the estimated rotational misalignment, the estimated spatial misalignment, or both.

Another apparatus is described. The apparatus may include means for transmitting one or more reference signals to a second wireless device using a first antenna array at the first wireless device and in accordance with a first precoder matrix, means for receiving, from the second wireless device based on the one or more reference signals, a feedback message indicating an estimated rotational misalignment, an estimated spatial misalignment, or both, between the first antenna array at the first wireless device and a second antenna array at the second wireless device, and means for transmitting a message to the second wireless device in accordance with a second precoder matrix that is modified relative to the first precoder matrix based on the estimated rotational misalignment, the estimated spatial misalignment, or both.

A non-transitory computer-readable medium storing code is described. The code may include instructions executable by a processor to transmit one or more reference signals to a second wireless device using a first antenna array at the first wireless device and in accordance with a first precoder matrix, receive, from the second wireless device based on the one or more reference signals, a feedback message indicating an estimated rotational misalignment, an estimated spatial misalignment, or both, between the first antenna array at the first wireless device and a second antenna array at the second wireless device, and transmit a message to the second wireless device in accordance with a second precoder matrix that is modified relative to the first precoder matrix based on the estimated rotational misalignment, the estimated spatial misalignment, or both.

Some examples of the method, apparatuses, and non-transitory computer-readable medium described herein may further include operations, features, means, or instructions for transmitting the one or more reference signals with a same phase across a set of multiple antenna elements of the first antenna array in accordance with the first precoder matrix, where the estimated rotational misalignment may be based on transmitting the one or more reference signals with the same phase.

In some examples of the method, apparatuses, and non-transitory computer-readable medium described herein, the estimated rotational misalignment may be estimated relative to one or more axes that may be perpendicular to an additional axis that extends from the first antenna array to the second antenna array.

Some examples of the method, apparatuses, and non-transitory computer-readable medium described herein may further include operations, features, means, or instructions for transmitting the one or more reference signals with a phase ramp across a set of multiple antenna elements of the first antenna array in accordance with the first precoder matrix, where the estimated rotational misalignment may be based on transmitting the one or more reference signals with the phase ramp.

In some examples of the method, apparatuses, and non-transitory computer-readable medium described herein, the estimated rotational misalignment may be estimated relative to an axis that extends from the first antenna array to the second antenna array.

Some examples of the method, apparatuses, and non-transitory computer-readable medium described herein may further include operations, features, means, or instructions for transmitting a first subset of reference signals of the one or more reference signals via a first subset of antenna elements of the first antenna array, where the first subset of reference signals may be transmitted with a first phase and transmitting a second subset of reference signals of the one or more reference signals via a second subset of antenna elements of the first antenna array, where the second subset of reference signals may be transmitted with a second phase that may be different from the first phase, where the estimated spatial misalignment may be based on transmitting the first subset of reference signals with the first phase and transmitting the second subset of reference signals with the second phase.

In some examples of the method, apparatuses, and non-transitory computer-readable medium described herein, the second phase includes an opposite sign compared to the first phase.

In some examples of the method, apparatuses, and non-transitory computer-readable medium described herein, the estimated spatial misalignment may be estimated relative to one or more axes that may be perpendicular to an additional axis that extends from the first antenna array to the second antenna array.

Some examples of the method, apparatuses, and non-transitory computer-readable medium described herein may further include operations, features, means, or instructions for communicating a control message indicating a reference signal waveform, where one or more reference signals may be transmitted in accordance with the reference signal waveform.

Some examples of the method, apparatuses, and non-transitory computer-readable medium described herein may further include operations, features, means, or instructions for receiving one or more additional reference signals from the second wireless device using the first antenna array and transmitting, to the second wireless device based on the one or more additional reference signals, a second feedback message indicating a second estimated rotational misalignment, a second estimated spatial misalignment, or both, between the first antenna array at the first wireless device and the second antenna array at the second wireless device, where the second precoder matrix may be modified relative to the first precoder matrix based on the second estimated rotational misalignment, the second estimated spatial misalignment, or both.

Some examples of the method, apparatuses, and non-transitory computer-readable medium described herein may further include operations, features, means, or instructions for performing measurements on the one or more additional reference signals, where the second estimated rotational misalignment, the second estimated spatial misalignment, or both, may be based on the measurements.

Some examples of the method, apparatuses, and non-transitory computer-readable medium described herein may further include operations, features, means, or instructions for estimating a set of multiple phases associated with the one or more additional reference signals along a second axis, a third axis, or both, where the second axis and the third axis may be perpendicular to the first axis, and where the second estimated rotational misalignment may be based on the set of multiple phases.

Some examples of the method, apparatuses, and non-transitory computer-readable medium described herein may further include operations, features, means, or instructions for comparing the one or more additional reference signals with a reference signal waveform, where the second estimated rotational misalignment, the second estimated spatial misalignment, or both, may be based on the comparing.

Some examples of the method, apparatuses, and non-transitory computer-readable medium described herein may further include operations, features, means, or instructions for determining a channel estimation matrix associated with a channel between the first antenna array and the second antenna array based on the estimated rotational misalignment, an estimated spatial misalignment, or both, where the second precoder matrix may be modified relative to the first precoder matrix based on the channel estimation matrix.

In some examples of the method, apparatuses, and non-transitory computer-readable medium described herein, the estimated spatial misalignment includes a parallel shift misalignment along one or more axes relative to the first antenna array, the second antenna array, or both.

A method is described. The method may include receiving one or more reference signals from a first wireless device using a second antenna array at the second wireless device and in accordance with a first postprocessing matrix, transmitting, to the first wireless device based on the one or more reference signals, a feedback message indicating an estimated rotational misalignment, an estimated spatial misalignment, or both, between the second antenna array at the second wireless device and a first antenna array at the first wireless device, and receiving a message from the first wireless device in accordance with a second postprocessing matrix that is modified relative to the first postprocessing matrix based on the estimated rotational misalignment, the estimated spatial misalignment, or both.

An apparatus is described. The apparatus may include a processor, memory coupled with the processor, and instructions stored in the memory. The instructions may be executable by the processor to cause the apparatus to receive one or more reference signals from a first wireless device using a second antenna array at the second wireless device and in accordance with a first postprocessing matrix, transmit, to the first wireless device based on the one or more reference signals, a feedback message indicating an estimated rotational misalignment, an estimated spatial misalignment, or both, between the second antenna array at the second wireless device and a first antenna array at the first wireless device, and receive a message from the first wireless device in accordance with a second postprocessing matrix that is modified relative to the first postprocessing matrix based on the estimated rotational misalignment, the estimated spatial misalignment, or both.

Another apparatus is described. The apparatus may include means for receiving one or more reference signals from a first wireless device using a second antenna array at the second wireless device and in accordance with a first postprocessing matrix, means for transmitting, to the first wireless device based on the one or more reference signals, a feedback message indicating an estimated rotational misalignment, an estimated spatial misalignment, or both, between the second antenna array at the second wireless device and a first antenna array at the first wireless device, and means for receiving a message from the first wireless device in accordance with a second postprocessing matrix that is modified relative to the first postprocessing matrix based on the estimated rotational misalignment, the estimated spatial misalignment, or both.

A non-transitory computer-readable medium storing code is described. The code may include instructions executable by a processor to receive one or more reference signals from a first wireless device using a second antenna array at the second wireless device and in accordance with a first postprocessing matrix, transmit, to the first wireless device based on the one or more reference signals, a feedback message indicating an estimated rotational misalignment, an estimated spatial misalignment, or both, between the second antenna array at the second wireless device and a first antenna array at the first wireless device, and receive a message from the first wireless device in accordance with a second postprocessing matrix that is modified relative to the first postprocessing matrix based on the estimated rotational misalignment, the estimated spatial misalignment, or both.

In some examples of the method, apparatuses, and non-transitory computer-readable medium described herein, the estimated rotational misalignment may be estimated relative to one or more axes that may be perpendicular to an additional axis that extends from the first antenna array to the second antenna array.

In some examples of the method, apparatuses, and non-transitory computer-readable medium described herein, the estimated rotational misalignment may be estimated relative to an axis that extends from the first antenna array to the second antenna array.

In some examples of the method, apparatuses, and non-transitory computer-readable medium described herein, the estimated spatial misalignment may be estimated relative to one or more axes that may be perpendicular to an additional axis that extends from the first antenna array to the second antenna array.

Some examples of the method, apparatuses, and non-transitory computer-readable medium described herein may further include operations, features, means, or instructions for communicating a control message indicating a reference signal waveform, where one or more reference signals may be communicated in accordance with the reference signal waveform.

Some examples of the method, apparatuses, and non-transitory computer-readable medium described herein may further include operations, features, means, or instructions for transmitting one or more additional reference signals to the first wireless device using the second antenna array and receiving, from the first wireless device based on the one or more additional reference signals, a second feedback message indicating a second estimated rotational misalignment, a second estimated spatial misalignment, or both, between the first antenna array at the first wireless device and the second antenna array at the second wireless device, where the second postprocessing matrix may be modified relative to the first postprocessing matrix based on the second estimated rotational misalignment, the second estimated spatial misalignment, or both.

Some examples of the method, apparatuses, and non-transitory computer-readable medium described herein may further include operations, features, means, or instructions for performing measurements on the one or more reference signals, where the estimated rotational misalignment, the estimated spatial misalignment, or both, may be based on the measurements.

Some examples of the method, apparatuses, and non-transitory computer-readable medium described herein may further include operations, features, means, or instructions for estimating a set of multiple phases associated with the one or more reference signals along a second axis, a third axis, or both, where the second axis and the third axis may be perpendicular to the first axis, and where the estimated rotational misalignment may be based on the set of multiple phases.

Some examples of the method, apparatuses, and non-transitory computer-readable medium described herein may further include operations, features, means, or instructions for comparing the one or more reference signals with a reference signal waveform, where the estimated rotational misalignment, the estimated spatial misalignment, or both, may be based on the comparing.

Some examples of the method, apparatuses, and non-transitory computer-readable medium described herein may further include operations, features, means, or instructions for determining a channel estimation matrix associated with a channel between the first antenna array and the second antenna array based on the estimated rotational misalignment, an estimated spatial misalignment, or both, where the second postprocessing matrix may be modified relative to the first postprocessing matrix based on the channel estimation matrix.

In some examples of the method, apparatuses, and non-transitory computer-readable medium described herein, the estimated spatial misalignment includes a parallel shift misalignment along one or more axes relative to the first antenna array, the second antenna array, or both.

DETAILED DESCRIPTION

Figure 1:
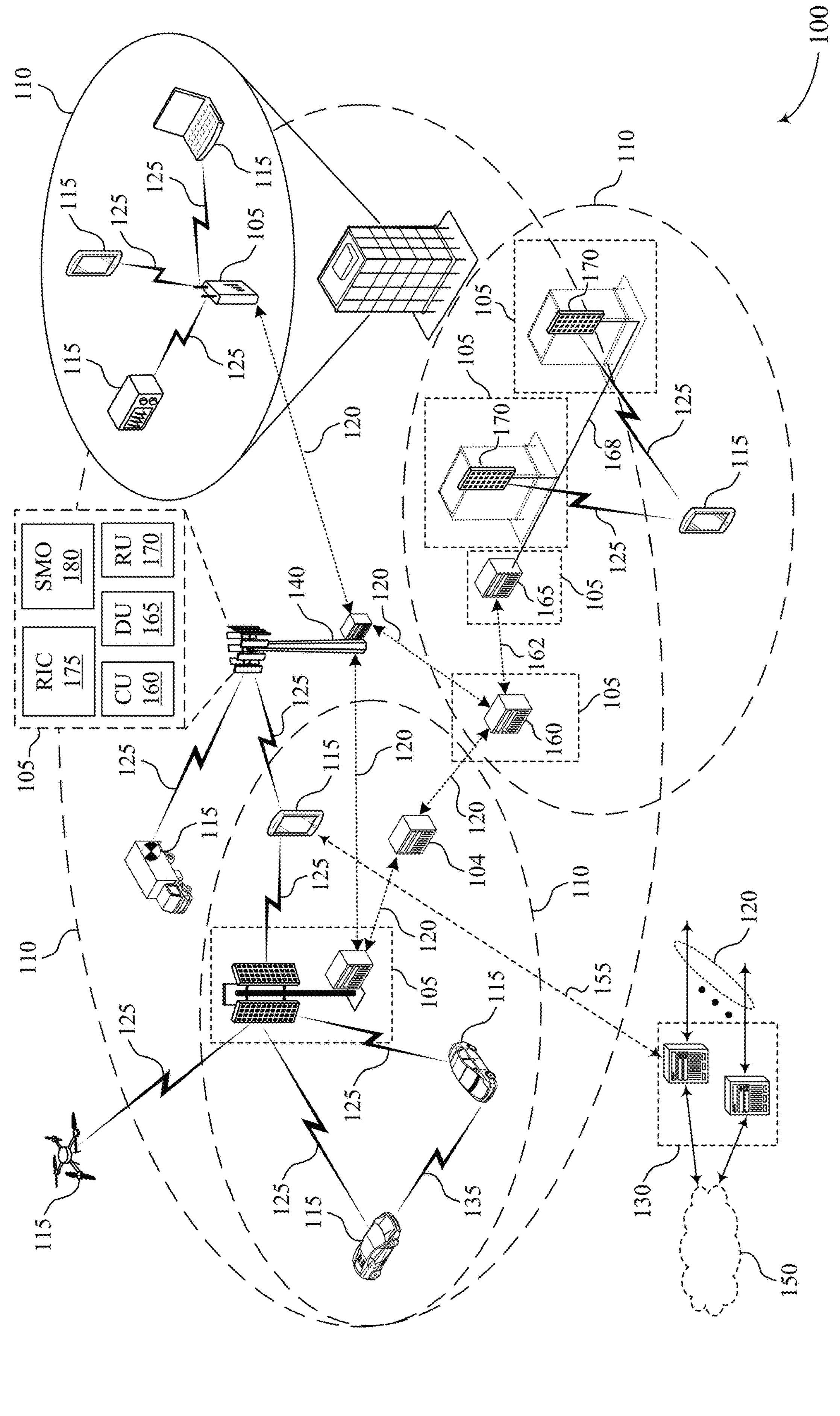
FIG. 1 illustrates an example of a wireless communications system that supports techniques for estimating misalignment between antenna arrays in accordance with one or more aspects of the present disclosure.

In some wireless communication systems, wireless devices exchange signaling with one another using antenna arrays that may include many individual antenna elements. For example, a transmitting (Tx) device may transmit a signal to a receiving (Rx) device using a Tx antenna array, where the Rx device receives the signal using an Rx antenna array. In such cases, the Rx device may decode the signal by determining the relative phase of the signal received at the respective antenna elements of the antenna array. However, the Tx and Rx antenna arrays may be misaligned with one another. Misalignment may occur when one (or both) of the antenna arrays are rotated with respect to an X, Y, and/or Z axis, and/or when one of the antenna arrays is laterally shifted relative to one another and/or relative to the propagation direction of the signal (e.g., the centers of the antenna arrays are shifted relative to one another). Such misalignments may result in disturbances in the phase of the signal received at the Rx device, which may detrimentally affect the ability of the Rx device to receive and decode received signals.

Accordingly, aspects of the present disclosure are directed to techniques for estimating misalignments between Tx and Rx antenna arrays. In particular, aspects of the present disclosure may be used to estimate rotational and/or translational misalignments between antenna arrays, where estimated misalignments may be used to adjust precoding matrices and/or postprocessing matrices used for communications between the respective devices. For example, wireless devices may exchange reference signals with one another using an initial precoding matrix and postprocessing matrix, where the reference signals are transmitted using different phase configurations across the respective Tx antenna array in order to estimate different types of misalignment.

For instance, a first device may transmit reference signals using the same phase across each antenna element of the Tx antenna array to enable a second device to estimate rotational misalignment in the X/Y directions. By way of another example, the first device may transmit reference signals using a phase ramp across the antenna elements of the Tx antenna array in the X or Y direction to enable the second device to estimate rotational misalignment in the Z direction. Further, the first device may transmit reference signals with opposite signs (e.g., S, −S) using different subsets of antenna arrays to enable the second device to estimate parallel shift misalignment in the X/Y directions. After estimating the misalignments, the Tx and Rx devices may selectively modify the precoding matrix and the postprocessing matrix in order to compensate for the estimated misalignments, and may subsequently use the updated matrices to perform wireless communications with one another.

Aspects of the disclosure are initially described in the context of wireless communications systems. Additional aspects of the disclosure are described in the context of example misalignment configurations and an example process flow. Aspects of the disclosure are further illustrated by and described with reference to apparatus diagrams, system diagrams, and flowcharts that relate to techniques for estimating misalignment between antenna arrays.

FIG. 1 illustrates an example of a wireless communications system 100 that supports techniques for estimating misalignment between antenna arrays in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for estimating misalignment between antenna arrays as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, wireless devices (e.g., UEs 115, network entities 105, IAB nodes, etc.) of the wireless communications system 100 may support techniques for estimating misalignments between Tx and Rx antenna arrays. In particular, aspects of the present disclosure may be used to estimate rotational and/or translational misalignments between antenna arrays, where estimated misalignments may be used to adjust precoding matrices and/or postprocessing matrices used for communications between the respective devices. For example, wireless devices may exchange reference signals with one another using an initial precoding matrix and postprocessing matrix, where the reference signals are transmitted using different phase configurations across the respective Tx antenna array in order to estimate different types of misalignment.

For instance, a first device (e.g., UE 115, network entity 105, IAB node, etc.) may transmit reference signals to a second device (e.g., another UE 115, network entity 105, IAB node, etc.) using the same phase across each antenna element of the Tx antenna array to enable a second device to estimate rotational misalignment in the X/Y directions. By way of another example, the first device may transmit reference signals using a phase ramp across the antenna elements of the Tx antenna array in the X or Y direction to enable the second device to estimate rotational misalignment in the Z direction. Further, the first device may transmit reference signals with opposite signs (e.g., S, −S) using different subsets of antenna arrays to enable the second the second device to estimate parallel shift misalignment in the X/Y directions. After estimating the misalignments, the Tx and Rx devices may selectively modify the precoding matrix and the postprocessing matrix in order to compensate for the estimated misalignments, and may subsequently use the updated matrices to perform wireless communications with one another.

Techniques described herein may enable wireless devices to estimate misalignments between antenna arrays, and compensate for such misalignments to improve an efficiency and reliability of wireless communications. In particular, techniques described herein may enable wireless devices to exchange reference signals (e.g., OAM waveforms) with one another using defined phase configurations (e.g., common phases, phase ramps, etc.) that enable the other respective devices to estimate rotational and/or translational shift misalignments. By enabling wireless devices to estimate misalignments, the respective devices may be able to update precoding and postprocessing matrices used to transmit and receive signals between the devices. As such, techniques described herein may improve an efficiency and reliability of wireless communications exchanged between devices, thereby reducing the quantity/proportion of retransmissions and leading to improved resource utilization and reduced power consumption.

Figure 2:
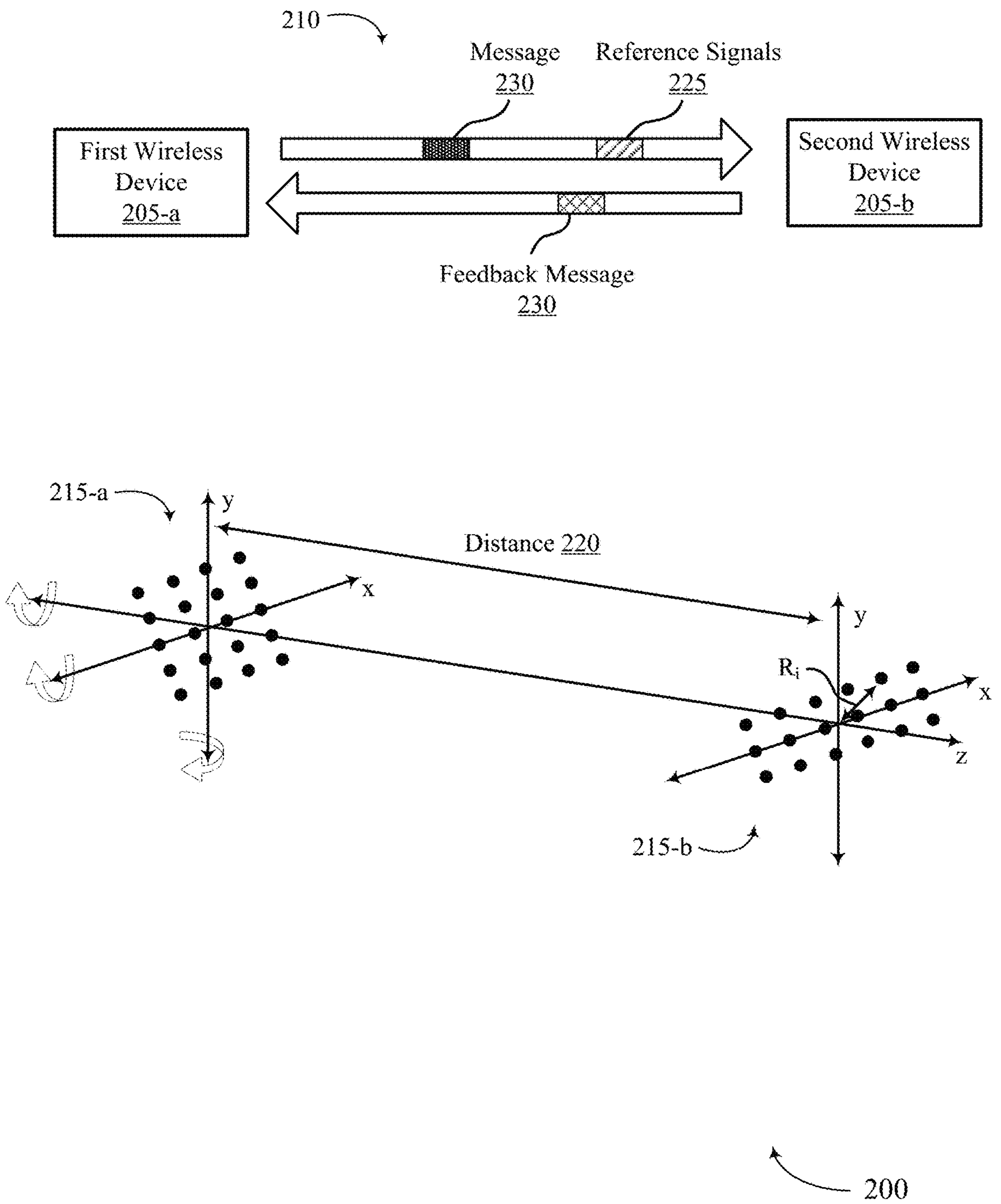
FIG. 2 illustrates an example of a wireless communications system that supports techniques for estimating misalignment between antenna arrays in accordance with one or more aspects of the present disclosure.

FIG. 2 illustrates an example of a wireless communications system 200 that supports techniques for estimating misalignment between antenna arrays in accordance with one or more aspects of the present disclosure. In some examples, aspects of the wireless communications system 200 may implement, or be implemented by, aspects of the wireless communications system 100. In particular, the wireless communications system 200 may support techniques for estimating and compensating for misalignments between antenna arrays, as described previously herein.

The wireless communications system 200 includes a first wireless device 205-*a* and a second wireless device 205-*b*, which may be examples of wireless devices as described herein. For example, in some cases, the first wireless device 205-*a* may include a network entity 105, and the second wireless device 205-*b* may include a UE 115. By way of another example, both wireless devices 205-*a*, 205-*b* may include UEs 115, IAB nodes, etc.

In some aspects, the first wireless device 205-*a* and the second wireless device 205-*b* may communicate with one another using a communication link 210, which may be an example of an NR or LTE link, a sidelink (e.g., PC5 link), and the like, between the respective devices. In some cases, the communication link 210 may include an example of an access link (e.g., Uu link) which may include a bi-directional link that enables both uplink and downlink communication. For example, the second wireless device 205-*b* may transmit uplink signals, such as uplink control signals or uplink data signals, to one or more components of the first wireless device 205-*a* using the communication link 210, and one or more components of the first wireless device 205-*a* may transmit downlink signals, such as downlink control signals or downlink data signals, to the second 2d 205-*b* using the communication link 210.

The first wireless device 205-*a* and the second wireless device 205-*b* may communicate with one another using a first antenna array 215-*a* and a second antenna array 215-*b*, respectively. Each of the respective antenna arrays 215 may include a set of antenna elements which may be used to transmit and/or receive communications. For example, as shown in FIG. 2, the first antenna array 215-*a* may include a 4×4 antenna array (e.g., 16 antenna elements), and the second antenna array 215-*b* may include a 6×3 antenna array (e.g., 18 antenna elements).

In some cases, the first antenna array 215-*a* may be referred to as a Tx antenna array, and the second antenna array 215-*b* may be referred to as an Rx antenna array. However, it is noted herein that the terms Tx and Rx, as described herein, may be used generally to refer to the relative direction of communications between devices. As such, both wireless devices 205-*a* and 205-*b*, and both antenna arrays 215-*a* and 215-*b*, may be configured to transmit signals to one another, receive signals from the other respective device, or both.

Figure 3:
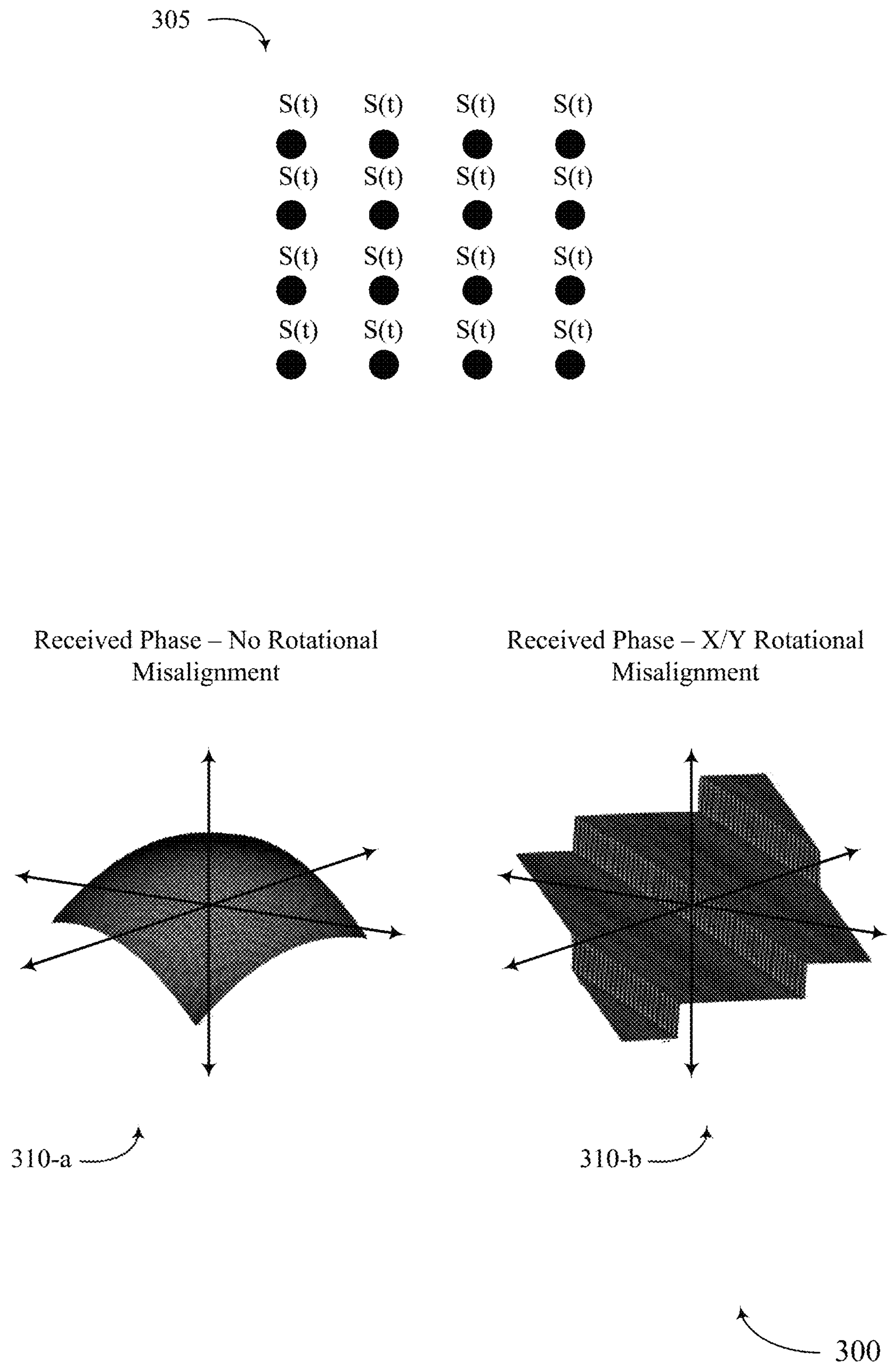
FIG. 3 illustrates an example of a misalignment configuration that supports techniques for estimating misalignment between antenna arrays in accordance with one or more aspects of the present disclosure.

As shown in FIG. 3, the antenna arrays 215-*a*, 215-*b* may be illustrated relative to one another using X, Y, and Z axes. In particular, the antenna arrays 215-*a*, 215-*b* may be illustrated in the X/Y plane, where the Z axis extends from one antenna array 215 to the other (e.g., Z axis passes through the center of each antenna array 215). In this regard, signals exchanged between the wireless devices 205 may propagate along (or parallel to) the Z axis. A distance 220 between the first wireless device 205-*a* and the second wireless device 205-*b* may be measured along the Z axis as the distance between centers of the respective antenna arrays 215 when the antenna arrays are perfectly aligned (e.g., no rotational or translational shift misalignment between the devices).

As noted previously herein, there are several types of misalignment that may occur between the first antenna array 215-*a* and the second antenna array 215-*b* which may detrimentally affect the performance of communications exchanged between the respective devices. The two primary types of misalignment may include rotational misalignment and translational shift misalignment (e.g., parallel shift misalignment). Rotational misalignment may occur when one or both of the antenna arrays 215 are rotated with respect to the X, Y, and/or Z axes. Rotational misalignment relative to the Z axis may be referred to as parallel rotation, where Rotational misalignment relative to the X and Y axes may be referred to as perpendicular rotation. Comparatively, shift misalignment may occur when the center of one (or both) of the antenna arrays 215 are shifted relative to one another. For example, shift misalignment may occur when the first antenna array 215-*a* is laterally shifted relative to the X axis (e.g., shift in X coordinates), relative to the Y axis (e.g., shift in Y coordinates), or both.

Both rotational and translational shift misalignments may result in disturbances in the phase of the signal received by the respective wireless devices 205, which may detrimentally affect the ability of the respective wireless devices 205 to receive and decode signals transmitted by the other respective device.

Accordingly, aspects of the present disclosure are directed to techniques that enable the wireless devices 205 to estimate and compensate for misalignments between the respective antenna arrays 215. In particular, aspects of the present disclosure may support techniques that enable the wireless devices 205 to estimate rotational and/or translational misalignments between the respective antenna arrays 215, where estimated misalignments may be used to adjust precoding matrices and/or postprocessing matrices used for communications between the respective wireless devices 205.

For example, referring to the wireless communications system 200 illustrated in FIG. 2, the first wireless device 205-*a* and the second wireless device may communicate (e.g., transmit, receive) a control message (e.g., RRC, DCI, MAC-CE) to/from one another, where the control message indicates a reference signal waveform associated with reference signals 225 (e.g., OAM reference signals 225) that may be communicated between the respective devices.

The first wireless device 205-*a* may transmit one or more reference signals 225 (e.g., OAM reference signals 225) to the second wireless device 205-*b*. For example, the first wireless device 205-*a* may transmit one or more reference signals 225 to the second wireless device 205-*b* in accordance with a first precoder matrix. Similarly, the second wireless device 205-*b* may receive the reference signals 225 using (e.g., in accordance with) a first postprocessing matrix. In some cases, the reference signals 225 may be transmitted at 715 according to the reference signal waveform(s) communicated/negotiated between the devices.

In some aspects, the first wireless device 205-*a* may transmit multiple different reference signals 225 according to different configurations to enable the second wireless device 205-*b* to measure different types of misalignment, such as rotational misalignment in the X, Y, and/or Z directions, shift misalignment, or any combination thereof.

For example, in order to enable the second wireless device 205-*b* to measure rotational misalignment in the X/Y directions, the first wireless device 205-*a* may transmit reference signals 225 with a same phase across a set of antenna elements of a first antenna array 215-*a* at the first wireless device 205-*a*, and in accordance with the first precoder matrix. Techniques for estimating rotational misalignment in the X/Y directions will be further shown and described with reference to FIG. 3.

By way of another example, in order to enable the second wireless device 205-*b* to measure rotational misalignment in the Z directions, the first wireless device 205-*a* devices may transmit reference signals 225 with a phase ramp across the set of antenna elements of the first antenna array 215-*a* at the first wireless device 205-*a*, and in accordance with the first precoder matrix. Techniques for estimating rotational misalignment in the Z direction will be further shown and described with reference to FIGS. 4 and 5.

By way of another example, in order to enable the second wireless device 205-*b* to measure parallel shift misalignment, the first wireless device 205-*a* devices may transmit a first subset of reference signals 225 using a first subset of antenna elements of the first antenna array 215-*a* with a first phase, and may transmit a second subset of reference signals 225 using a second subset of antenna elements of the first antenna array 215-*a* with a second phase that is different from the first phase. For instance, the first wireless device 205-*a* may transmit a first subset of reference signals 225 with a first phase S(t), and may transmit a second subset of reference signals 225 with a second phase −S(t) which is associated with an opposite sign (e.g., ±S(t)). Techniques for estimating spatial misalignment (e.g., parallel/lateral shift misalignment) will be further shown and described with reference to FIG. 6.

In some aspects, the second wireless device 205-*b* may perform measurements on the reference signals 225. For example, the second wireless device 205-*b* may perform measurements to estimate a phase of the reference signals 225 received at the respective antenna elements of the second antenna array 215-*b* (e.g., estimate phases of reference signals 225 along X, Y, Z directions). Additionally, or alternatively, the second wireless device 205-*b* may perform other types of measurements, such as RSSI, RSRP, RSRQ, SNR, SINR, and the like.

In some implementations, the second wireless device 205-*b* may compare the received reference signals 225 with the reference signal waveform. In some cases, comparing the reference signals 225 (e.g., phase of the received reference signals 225) to the reference signal waveform may enable the second wireless device 205-*b* to estimate misalignments between the antenna arrays 215 of the respective devices.

The second wireless device 205-*b* may estimate one or more misalignments (e.g., estimated rotational misalignment, estimated spatial misalignment, and the like) between antenna arrays 215 of the respective devices. The second wireless device 205-*b* may estimate the one or more misalignments based on receiving the reference signals 225, performing the measurements on the reference signals, comparing the reference signals 225 to the reference signal waveform, or any combination thereof.

For example, the second wireless device 205-*b* may be configured to estimate rotational misalignment with respect to the X/Y axes in cases where the first wireless device 205-*a* transmits the reference signals 225 with a same phase, as will be further shown and described with respect to FIG. 3. In such cases, the estimated rotational misalignment may be estimated relative to one or more axes that are perpendicular to an additional axis that extends from the first antenna array 215-*a* of the first wireless device 205-*a* to the second antenna array 215-*b* of the second wireless device 205-*b*.

By way of another example, the second wireless device 205-*b* may be configured to estimate rotational misalignment with respect to the Z axis in cases where the first wireless device 205-*a* transmits the reference signals 225 with a phase ramp, as will be further shown and described with reference to FIG. 4. Additionally, or alternatively, the second wireless device 205-*b* may be configured to estimate rotational misalignment with respect to the Z axis in cases where the first wireless device 205-*a* transmits subsets of reference signals 225 with different (e.g., opposite) phase, as will be further shown and described with reference to FIG. 5. In such cases, the estimated rotational misalignment may be estimated relative to the Z axis that extends from the Tx antenna array 215-*a* to the Rx antenna array 215-*b*.

By way of another example, the second wireless device 205-*b* may be configured to estimate spatial misalignment (e.g., parallel/lateral shift misalignment) axes in cases where the first wireless device 205-*a* transmits subsets of reference signals 225 with different (e.g., opposite) phase, as will be further shown and described with reference to FIG. 6. In such cases, the estimated spatial misalignment may be estimated relative to the X/Y axes that are perpendicular to the Z axis that extends from the first antenna array 215-*a* to the second antenna array 215-*b*.

The second wireless device 205-*b* may transmit a feedback message 230 to the first wireless device 205-*a*, where the feedback message 230 indicates one or more misalignments (e.g., estimated rotational misalignment, estimated spatial misalignment, or both) between the first antenna array 215-*a* at the first wireless device 205-*a* and the second antenna array 215-*b* at the second wireless device 205-*b*.

In some aspects, first wireless device 205-*a*, the second wireless device 205-*b*, or both, may determine a channel estimation matrix associated with a channel between the first antenna array 215-*a* and the second antenna array 215-*b*. In some aspects, the devices may determine the channel estimation matrix based on the estimated misalignment(s) indicated via the feedback message 230.

In some aspects, first wireless device 205-*a* may determine a new precoding matrix that will be used for transmitting signals to the second wireless device 205-*b*. In other words, the first wireless device 205-*a* may update/modify the first precoding matrix which was used to transmit the reference signals 225 to generate a second precoding matrix. In particular, the first wireless device 205-*a* may update/modify the first precoding matrix based on the estimated rotational misalignment, the estimated spatial misalignment (e.g., parallel/lateral shift misalignment) which was indicated via the feedback message 230.

Similarly, the second wireless device 205-*b* may determine a new postprocessing matrix that will be used for receiving signals from the first wireless device 205-*a*. In other words, the second wireless device 205-*b* may update/modify the first postprocessing matrix which was used to receive the reference signals 225 to generate a second postprocessing matrix. In particular, the second wireless device 205-*b* may update/modify the first postprocessing matrix based on the estimated rotational misalignment, the estimated spatial misalignment (e.g., parallel/lateral shift misalignment) which was indicated via the feedback message 230.

Subsequently, the first wireless device 205-*a* may transmit a message 230 (e.g., data message, reference signal, etc.) to the second wireless device 205-*b* using (e.g., in accordance with) the second precoder matrix. Similarly, the second wireless device 205-*b* may receive the message 230 from the first wireless device 205-*a* using (e.g., in accordance with) the second postprocessing matrix.

In some implementations, the steps/operations used to estimate misalignments and modify precoding/postprocessing matrices may be repeated multiple times in order to reduce misalignments between the antenna arrays 215, and therefore improve an efficiency and reliability of communications exchanged between the devices. In some cases, the process for estimating misalignment may occur a pre-defined number of times, over a predetermined time interval/ duration, and/or until estimated misalignments are sufficiently small (e.g., less than some threshold).

While the wireless communications system 200 is shown and described in the context of the first wireless device 205-*a* as the "Tx device" and the second wireless device 205-*b* as the "Rx device," this is solely for illustrative purposes, and is not to be regarded as a limitation of the present disclosure. For example, in some cases, the second wireless device 205-*b* may transmit reference signals 225 to the first wireless device 205-*a*, and the first wireless device 205-*a* may perform measurements on the received reference signals 225, compare the reference signals 225 to the reference signal waveform, estimate misalignments between the antenna arrays 215, and transmit a feedback message 230 to the second wireless device 205-*b* indicating estimated misalignments. In such cases, the second wireless device 205-*b* may update a precoding matrix, and the first wireless device 205-*a* may update a postprocessing matrix, as described herein.

Techniques described herein may enable the wireless devices 205 to estimate misalignments between antenna arrays, and compensate for such misalignments to improve an efficiency and reliability of wireless communications. In particular, techniques described herein may enable the wireless devices 205 to exchange reference signals 225 (e.g., OAM waveforms) with one another using defined phase configurations (e.g., common phases, phase ramps, etc.) that enable the other respective devices to estimate rotational and/or translational shift misalignments. By enabling the wireless devices 205 to estimate misalignments, the respective devices may be able to update precoding and postprocessing matrices used to transmit and receive signals between the devices. As such, techniques described herein may improve an efficiency and reliability of wireless communications exchanged between the wireless devices 205, thereby reducing the quantity/proportion of retransmissions and leading to improved resource utilization and reduced power consumption.

FIG. 3 illustrates an example of a misalignment configuration 300 that supports techniques for estimating misalignment between antenna arrays in accordance with one or more aspects of the present disclosure. In some examples, aspects of the misalignment configuration 300 may implement, or be implemented by, aspects of the wireless communications system 100, the wireless communications system 200, or both. In particular, the misalignment configuration 300 illustrates techniques which may be used between devices to estimate rotational misalignment between Tx and Rx antenna arrays with respect to the X and Y axes, as described herein.

In order to measure or estimate the rotation of an OAM waveform in the X and/or Y axis, a Tx device may transmit a same pilot signals for both X and Y rotational misalignment estimates. For example, a Tx device may use a Mode 0 OAM waveform as a pilot signal, where each antenna element in the Tx antenna array is used to transmit an identical OAM signal/waveform. For instance, as shown in FIG. 3, a Tx device may transmit pilot signals (e.g., reference signals) using a Tx antenna array 305, where each respective antenna element of the Tx antenna array transmits pilot/reference signals with a common waveform, such as S(t), and with a same phase.

In such cases, a linear phase ramp of the OAM waveform received at the Rx device may be related to (e.g., used to estimate) the amount of rotation in the X and Y axis. In other words, the phase ramp of the OAM waveform at the Rx device may be used to measure an amount of rotational misalignment between the Tx and Rx antenna arrays.

The rotation order (e.g., rotational misalignment) with respect to the Z, Y, and X axes may be represented via a rotation matrix, which is illustrated in Equation 1 and Equation 2 below:

$$R = R_z(\alpha)R_y(\beta)R_x(\gamma) = \begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix} \tag{1}$$

$$R = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\cos\gamma \\ \sin\alpha\cos\beta & \sin\alpha\sin\beta\sin\gamma + \cos a\cos\gamma & \sin\alpha\sin\beta\cos\gamma - \cos a\cos\gamma \\ -\sin\beta & \cos\beta\sin\gamma & \cos\beta\cos\gamma \end{bmatrix} \tag{2}$$

where the three matrices in Equation 1 represent yaw, pitch, and roll rotations with respect to the Z, Y, and X axes, respectively.

The linear phase ramp over the Y and X axis may be represented via Equation 3 and Equation 4 below:

$$-2\pi h * \sin(\theta_y) \tag{3}$$

$$2\pi h * \cos(\theta_y) * \sin(\theta_x) \tag{4}$$

where Equation 3 represents the slope in the Y axis, and Equation 4 represents the slope in the X axis.

Using Equations 1-4 above, an Rx device may estimate average phase rotations relative to the X and Y axes based on estimating slopes of the phase ramps. In particular, an Rx device may compute a phase rotation between two adjacent samples of the received OAM waveform along the X and Y axes, and take an average over/across the X and Y axes. After estimation, the Rx device may apply phase compensation at adjacent samples.

For instance, the phase graph 310-*a* shown in FIG. 3 illustrates the received phase of reference signals transmitted by the Tx antenna array 305 and received by the Rx device when there is no rotational misalignment between the Tx and Rx antenna arrays relative to the X and Y axes. Comparatively, the phase graph 310-*b* shown in FIG. 3 illustrates the received phase reference signals transmitted by the Tx antenna array 305 and received by the Rx device when there is rotational misalignment between the Tx and Rx antenna arrays relative to the X and Y axes. As such, the Rx device may be configured to estimate rotational misalignment by computing phase rotations between adjacent samples of the OAM waveform illustrated in the phase graph 310-*b*.

An example estimation and compensation algorithm for estimating rotational misalignment relative to the X axis is illustrated in Equation 5 and Equation 6 below:

$$\frac{\frac{e^{-j2\pi d_1}}{d_1} + \frac{e^{-j2\pi d_2}}{d_2}}{\frac{e^{-j2\pi d'_1}}{d'_1} + \frac{e^{-j2\pi d'_2}}{d'_2}} \approx \frac{e^{-j2\pi d_1} + e^{-j2\pi d_2}}{e^{-j2\pi d'_1} + e^{-j2\pi d'_2}} \approx e^{j2\pi\Delta}, \ (d \gg h) \tag{5}$$

$$\left[e^{-j2\pi\Delta/2} e^{j2\pi\Delta/2}\right] \tag{6}$$

where Δ=h*sin(θ), and where Equation 5 illustrates a phase difference between Rx antennas, and where Equation 6 illustrates a compensation in which phase shifts may be applied at Rx antenna elements.

In the context of compensating for rotational misalignment in the X and Y directions (e.g., perpendicular X/Y rotation), the respective devices (e.g., Tx device, Rx device) may be configured to transmit OAM signals to one another such that the Tx device and the Rx device may each estimate rotational misalignment between the respective antenna arrays, and share estimated rotational misalignment information with one another. Based on the estimated rotational misalignment information, a channel estimation matrix associated with a channel between the respective devices (e.g., between the respective antenna arrays) may be updated at both the Tx and Rx devices. Further, the Tx device may be configured to update a precoder matrix (V), and the Rx device may be configured to update a postprocessing matrix (U) based on the updated channel estimation matrix and/or rotational misalignment estimated by the respective devices.

For general cases (e.g., non-far-field contexts), the Tx device may estimate θ and $\vec{u}$ to construct rotation matrix ($K_{\vec{t}}$) according to Equations 7 and 8 below, and the Rx device may estimate φ and $\vec{t}$ to construct rotation matrix ($K_{\vec{u}}$) according to Equations 9 and 10 below:

$$K_{\vec{u}} = \begin{bmatrix} 0 & -\vec{u}(3) & \vec{u}(2) \\ \vec{u}(3) & 0 & -\vec{u}(1) \\ -\vec{u}(2) & \vec{u}(1) & 0 \end{bmatrix} \tag{7}$$

$$R_{\varphi,\vec{u}} = I + \sin(\varphi) K_{\vec{u}} + (1 - \cos(\varphi)) K_{\vec{u}}^2 \tag{8}$$

$$K_{\vec{t}} = \begin{bmatrix} 0 & -\vec{t}(3) & t(2) \\ \vec{t}(3) & 0 & -\vec{t}(1) \\ -\vec{t}(2) & \vec{t}(1) & 0 \end{bmatrix} \tag{9}$$

$$R_{\theta,\vec{t}} = I + \sin(\theta) K_{\vec{t}} + (1 - \cos(\theta)) K_{\vec{t}}^2 \tag{10}$$

where $\vec{u}$ represents a unit vector in the X/Y plane over which the Tx antenna array 305 is rotated, and φ represents the rotation angle for the Tx antenna array 305 (φ∈[0 2π]). Similarly, $\vec{t}$ represents a unit vector in the X/Y plane over which the Rx antenna array is rotated, and θ represents the rotation angle for the Rx antenna array (θ∈[0 2π]).

Subsequently, the Tx and Rx devices may be configured to inform one another as to the estimated misalignment at each of the respective devices. In other words, the Tx device may indicate $R_{\varphi,\vec{u}}$ (e.g., estimated rotational misalignment at the Tx device) to the Rx device, and the Rx device may indicate $R_{\theta,\vec{t}}$ (e.g., estimated rotational misalignment at the Rx device) to the Tx device. Using the estimated rotational misalignment information at the respective devices, the Tx device, the Rx device, or both, may update a channel matrix (H) according to Equation 11 and 12 below:

$$H_{ij}^{new} = H_{ij} e^{-j\frac{2\pi\left(\vec{d}_{ij}^{T}\left(R_{\varphi,\vec{u}} - I\right)r_i - \vec{d}_{ij}^{T}\left(R_{\theta,\vec{t}} - I\right)\vec{s}_j\right)}{\lambda\|\vec{d}_{ij}\|}} \tag{11}$$

$$\vec{d}_{ij} = \vec{d} + \vec{r}_i - \vec{s}_j \tag{12}$$

for i=1, 2, . . . , M and j=1, 2, . . . , N, where $\vec{d}$ is a distance vector between the Tx and Rx antenna arrays when the centers of the antenna arrays are perfectly aligned (e.g., no misalignment), $\vec{s}_j$ is location vector of the ith Tx antenna element from the center of the Tx antenna array when the centers of the antenna arrays are perfectly aligned, and $\vec{r}_i$ is location vector of the ith Rx antenna element from the center of the Rx antenna array when the centers of the antenna arrays are perfectly aligned. The devices may then perform a singular value decomposition (SVD) to retrieve a new precoding matrix ($V^{New}$) and a new postprocessing matrix ($U^{New}$) at the Tx device and the Rx device, respectively.

In some aspects, simplifications may be made for estimating rotational misalignment in the context of far-field scenarios. In far-field scenarios, the Tx and Rx devices may each estimate rotational misalignment between the respective antenna arrays. However, in the context of far-field scenarios, the devices may not exchange estimated rotational misalignment information with one another. Rather, the respective devices may locally update channel estimation matrices and precoding/postprocessing matrices. For example, the Tx device may locally update the precoder matrix (V) based on its own estimated rotational misalignment information, and the Rx device may locally update the postprocessing matrix (U) based on its own estimated rotational misalignment information.

For example, in the context of far-field scenarios, the Tx device may locally estimate rotation parameters φ and $\vec{u}$ to construct a rotation matrix ($K_{\vec{u}}$) according to Equations 13 and 14, and the Rx device may locally estimate rotation parameters θ and $\vec{t}$ according to Equations 15 and 16 below:

$$K_{\vec{u}} = \begin{bmatrix} 0 & -\vec{u}(3) & \vec{u}(2) \\ \vec{u}(3) & 0 & -\vec{u}(1) \\ -\vec{u}(2) & \vec{u}(1) & 0 \end{bmatrix} \tag{13}$$

$$R_{\varphi,\vec{u}} = I + \sin(\varphi) K_{\vec{u}} + (1 - \cos(\varphi)) K_{\vec{u}}^2 \tag{14}$$

$$K_{\vec{t}} = \begin{bmatrix} 0 & -\vec{t}(3) & \vec{t}(2) \\ \vec{t}(3) & 0 & -\vec{t}(1) \\ -\vec{t}(2) & \vec{t}(1) & 0 \end{bmatrix} \tag{15}$$

$$R_{\theta,\vec{t}} = I + \sin(\theta) K_{\vec{t}} + (1 - \cos(\theta)) K_{\vec{t}}^2 \tag{16}$$

where $\vec{u}$ represents a unit vector in the X/Y plane over which the Tx antenna array 305 is rotated, and φ represents the rotation angle for the Tx antenna array 305 (φ∈[0 2π]).

After exchanging reference/pilot signals with one another, locally estimating rotational misalignment, and updating a channel matrix, the Tx and Rx devices may update the precoder matrix and the postprocessing matrix, respectively, which are used for communications between the respective devices. For example, the Tx device may update a precoder matrix ($V^{New}$) according to Equation 17, and the Rx device may update a postprocessing matrix (U) according to Equation 18:

$$V_{ij} = V_{ij} e^{-j\frac{2\pi\left(\vec{d}^{T}\left(R_{\theta,\vec{t}} - I\right)\vec{s}_j\right)}{\lambda\|\vec{d}\|}} \tag{17}$$

$$U_{ij} = U_{ij} e^{-j\frac{2\pi\left(\vec{d}^{T}\left(R_{\varphi,\vec{u}} - I\right)\vec{r}_i\right)}{\lambda\|\vec{d}\|}} \tag{18}$$

Figure 4:
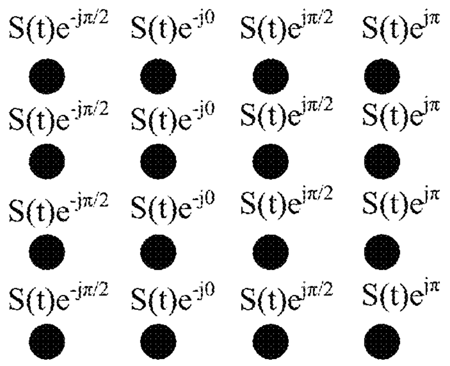
FIG. 4 illustrates an example of a misalignment configuration that supports techniques for estimating misalignment between antenna arrays in accordance with one or more aspects of the present disclosure.
Figure 4:
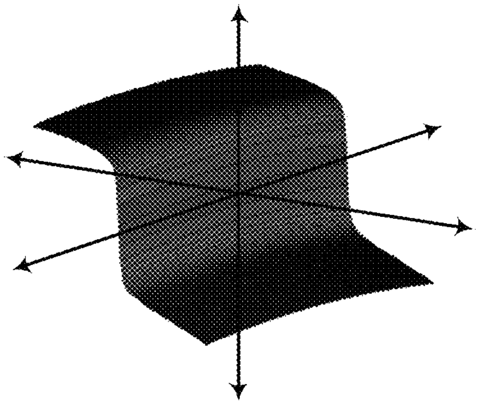
Figure 4:
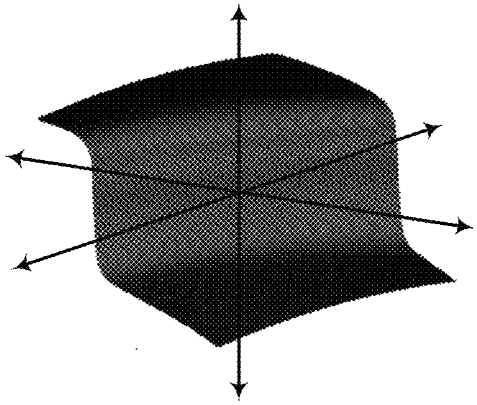

FIG. 4 illustrates an example of a misalignment configuration 400 that supports techniques for estimating misalignment between antenna arrays in accordance with one or more aspects of the present disclosure. In some examples, aspects of the misalignment configuration 400 may implement, or be implemented by, aspects of the wireless communications system 100, the wireless communications system 200, the misalignment configuration 300, or any combination thereof. In particular, the misalignment configuration 400 illustrates techniques which may be used between devices to estimate rotational misalignment between Tx and Rx antenna arrays with respect to the Z axis, as described herein.

In order to measure or estimate the rotation of an OAM waveform in the Z axis, a Tx device may transmit reference/pilot signals with a phase ramp in the X and/or Y axis. For example, a Tx device may use a Mode 0 OAM waveform as a pilot signal, where the pilot signals are transmitted with a phase ramp within the interval [−π π] for the X axis. For instance, as shown in FIG. 4, a Tx device may transmit same pilot signals (e.g., reference signals) using a Tx antenna array 405 with 1000A, where the pilot/reference signals are transmitted by each respective antenna element of the Tx antenna array according to a phase ramp illustrated by the respective phases (e.g., $S(t)e^{-j\pi/2}$, $S(t)^{e-j0}$, $S(t)e^{j\pi/2}$, $S(t)e^{j\pi}$).

In some aspects, the Rx device may be configured to estimate an amount of rotational misalignment relative to the Z axis based on a slope of a plane at the phase transition of received pilot signals. In particular, the Rx device may be configured to calculate phase ramp ratios (e.g., tilt of edge) of received pilot signals relative to the X and Y axes. For example, the Rx device may be configured to calculate an average phase ramp over the X axis (e.g., slope-x) and an average phase ramp over the Y axis (e.g., slope-y), and may be configured to calculate an estimated rotational misalignment between antenna arrays relative to the Z axis using Equation 19 below:

$$\hat{\theta} = a\tan\left(\frac{\text{phase slope} - x \text{ axis}}{\text{phase slope} - y \text{ axis}}\right) \quad (19)$$

In some aspects, the phase graph 410-*a* illustrates the received phase of reference signals transmitted by the Tx antenna array 405 and received by the Rx device when there is no rotational misalignment in the Z axis (Tx(4×4), $h_{Tx}=\lambda$, $r=1000\lambda$, $\theta_z=0$). Comparatively, the phase graph 410-*b* illustrates the received phase of reference signals transmitted by the Tx antenna array 405 and received by the Rx device when there is some amount of rotational misalignment in the Z axis (Tx(4×4), $h_{Tx}=\lambda$, $r=1000\lambda$, $\theta_z=20$).

Figure 5:
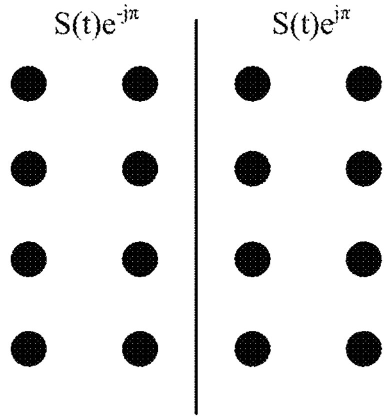
FIG. 5 illustrates an example of a misalignment configuration that supports techniques for estimating misalignment between antenna arrays in accordance with one or more aspects of the present disclosure.
Figure 5:
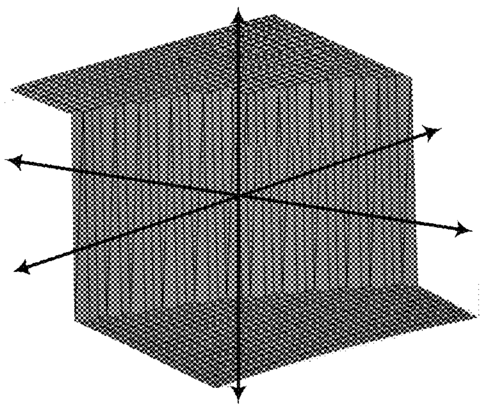

Rotational misalignment relative to the Z axis may additionally or alternatively be estimated according to techniques illustrated in FIG. 5.

FIG. 5 illustrates an example of a misalignment configuration 500 that supports techniques for estimating misalignment between antenna arrays in accordance with one or more aspects of the present disclosure. In some examples, aspects of the misalignment configuration 500 may implement, or be implemented by, aspects of the wireless communications system 100, the wireless communications system 200, the misalignment configuration 300, the misalignment configuration 400, or any combination thereof. In particular, the misalignment configuration 500 illustrates techniques which may be used between devices to estimate rotational misalignment between Tx and Rx antenna arrays with respect to the Z axis, as described herein.

In order to measure or estimate the rotation of an OAM waveform in the Z axis, a Tx device may transmit reference/pilot signals using subsets of antenna elements with opposite signs along the X or Y axes. For example, as shown in FIG. 5, a Tx device may transmit pilot signals (e.g., reference signals) using a Tx antenna array 505, where a first subset of antenna elements are configured to transmit pilot/reference signals with a first sign (e.g., $S(t)e^{-j\pi}$), and where a second subset of antenna elements are configured to transmit pilot/reference signals with a second sign that is opposite the first sign (e.g., $S(t)e^{j\pi}$). In this regard, the Tx antenna array 505 may be divided along the X axis (or Y axis).

In such cases, the Rx device may be configured to estimate an amount of rotational misalignment relative to the Z axis based on a slope of a plane at the phase transition of received pilot signals. In particular, the Rx device may be configured project the phase transition plane onto the X/Y plane, and fit to a line (e.g., slope of the phase transition) in order to calculate rotational misalignment in the Z axis. In some aspects, the phase graph 510 illustrates the received phase of reference signals transmitted by the Tx antenna array 505 and received by the Rx device when there is some amount of rotational misalignment in the Z axis (Tx(8×8, 16×16), $h_{Tx}=\lambda$, $r=1000\lambda$, $\theta_z=20$).

Figure 6:
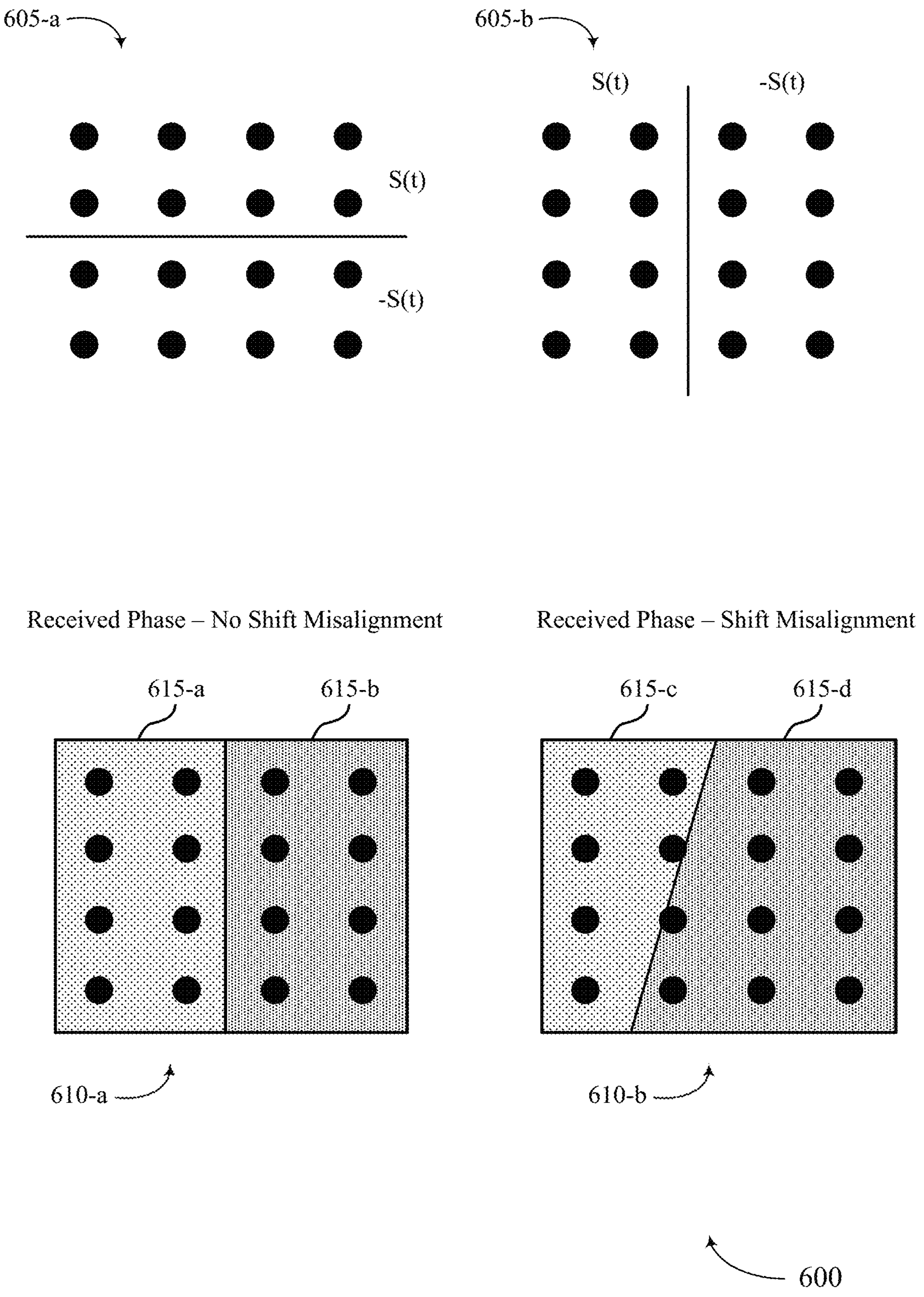
FIG. 6 illustrates an example of a misalignment configuration that supports techniques for estimating misalignment between antenna arrays in accordance with one or more aspects of the present disclosure.

FIG. 6 illustrates an example of a misalignment configuration 600 that supports techniques for estimating misalignment between antenna arrays in accordance with one or more aspects of the present disclosure. In some examples, aspects of the misalignment configuration 600 may implement, or be implemented by, aspects of the wireless communications system 100, the wireless communications system 200, the misalignment configurations 300, 400, 500, or any combination thereof. In particular, the misalignment configuration 600 illustrates techniques which may be used between devices to estimate shift misalignments (e.g., parallel shift misalignment) between Tx and Rx antenna arrays, as described herein.

In order to measure shift misalignments, Tx antenna arrays may be used to transmit reference/pilot signals using opposite phases (e.g., upper and lower modulation). For example, in order to estimate parallel shift misalignment in the Y axis, the upper and lower portions of a Tx antenna array 605-*a* may be used to transmit reference signals with opposite phase. For instance, as shown in FIG. 6, in order to estimate shift misalignment in the Y axis, Tx device may transmit pilot signals (e.g., reference signals) using a Tx antenna array 605-*a*, where a first subset of antenna elements within an upper portion of the Tx antenna array 605-*a* are configured to transmit pilot/reference signals with a first sign (e.g., S(t)), and where a second subset of antenna elements within a lower portion of the Tx antenna array 605-*a* are configured to transmit pilot/reference signals with a second sign that is opposite the first sign (e.g., −S(t)).

Similarly, in order to estimate parallel shift misalignment in the X axis, the left and right portions of a Tx antenna array 605-*b* may be used to transmit reference signals with opposite phase. For instance, as shown in FIG. 6, in order to estimate shift misalignment in the X axis, Tx device may transmit pilot signals (e.g., reference signals) using a Tx antenna array 605-*b*, where a first subset of antenna elements on a first lateral side of the Tx antenna array 605-*a* are configured to transmit pilot/reference signals with a first sign (e.g., S(t)), and where a second subset of antenna elements on a second lateral side of the Tx antenna array 605-*a* are configured to transmit pilot/reference signals with a second sign that is opposite the first sign (e.g., −S(t)).

In some aspects, the Rx device may be configured to estimate shift misalignment (e.g., parallel shift misalignment, lateral shift misalignment in the X/Y axes) by determining/estimating where the phase jump happens. Shift misalignment in the Y and X axis may be estimated separately (e.g., using different sets of reference/pilot signals transmitted according to the Tx antenna array 605-*a* and the Tx antenna array 605-*b*, respectively.

In cases where there is no shift misalignment, the phase jump may occur in the middle of the Rx antenna array. For instance, the phase graph 610-*a* illustrates the received phases 615-*a*, 615-*b* of reference signals transmitted by the Tx antenna array 605-*a* and received by the Rx device when there is no shift misalignment. Comparatively, in cases where there is some degree of shift misalignment, the phase jump of reference/pilot signals received at the Rx device may be shifted relative to a center of the Rx antenna array. For instance, the phase graph 610-*b* illustrates the received phases 615-*c*, 615-*d* of reference signals transmitted by the Tx antenna array 605-*a* and received by the Rx device when there is some shift misalignment and rotational misalignment in the Z axis. In some aspects, the resolution for estimating misalignment may be based on a distance between antenna elements (h).

In some aspects, in order to estimate shift misalignment, the Rx device may be configured to take the inner product between the phase of received reference/pilot signals (e.g., received OAM waveforms) and a desired/expected phase for each hypothesis, where peaks indicate fractional shifts. For example, a first hypothesis (Hypothesis 1) may be determined by taking the inner products between the known reference signal waveform and the waveforms received at the Rx device (e.g., inner product between Tx and Rx signals). A second hypothesis (Hypothesis 2) may be determined by taking the inner product between the known reference signal waveform and the received waveform with shift (e.g., lambda, lambda, where lambda is the wavelength of the known waveform). Further, a third hypothesis (Hypothesis 3) may be determined by taking the inner product between the known reference signal waveform and the received waveform with shift (e.g., ½*lambda, lambda). To find the estimated shift misalignment (in X and Y directions), the Rx device may be configured to identify the hypothesis with the largest inner product (e.g., the largest inner product may be identified as the best estimate for X/Y shift misalignment).

After calculating shift misalignment, the respective devices may be configured to calculate or update a precoding matrix and a postprocessing matrix that will be used for communications between the respective devices, as illustrated in Equation 20 and Equation 21 below:

$$V_{ij}^{new} = V_{ij} e^{-j\frac{2\pi\left(\vec{s_j}\cdot\vec{\Delta}\right)}{\lambda\|\vec{d}\|}}, \text{ for } i, j = 1, 2, \ldots, N \tag{20}$$

$$U_{ij}^{new} = U_{ij} e^{-j\frac{2\pi\left(\vec{r_j}\cdot\vec{\Delta}\right)}{\lambda\|\vec{d}\|}}, \text{ for } i, j = 1, 2, \ldots, M \tag{21}$$

where $\vec{\Delta}$ represents a parallel shift vector in three-dimensional (3D) space (e.g., estimated shift misalignment), d is the distance between the Tx and Rx antenna arrays (when perfectly aligned), and $(\vec{s_j}\cdot\vec{r_i})$ represents the local coordinates of the $j^{th}$ Tx antenna element and the $i^{th}$ Rx antenna element. In this regard, the Tx device and the Rx device may report to one another the locally calculated shift misalignment, and the respective devices may update the precoding matrix $$V_{ij}^{new}$$

and postprocessing matrix $$U_{ij}^{new}$$

based on the shift misalignment(s) calculated at the respective devices.

In some implementations, shift misalignments between the Tx and Rx antenna arrays may be characterized in terms of rotational misalignments. That is, in some implementations, the Tx device, the Rx device, or both, may be configured to estimate shift misalignments (e.g., parallel shift misalignments), and convert the shift misalignments to X/Y rotational misalignments (or vice versa). For example, the respective devices may transmit reference/pilot signals to one another, locally calculate shift misalignments, and convert the shift misalignments into estimated rotational misalignments relative to the X/Y axes. In such cases, the respective devices may be able to compensate for the estimated rotational misalignments, and therefore the estimated shift misalignments, by calculating new channel estimation matrices, precoding matrices, and/or postprocessing matrices.

Figure 7:
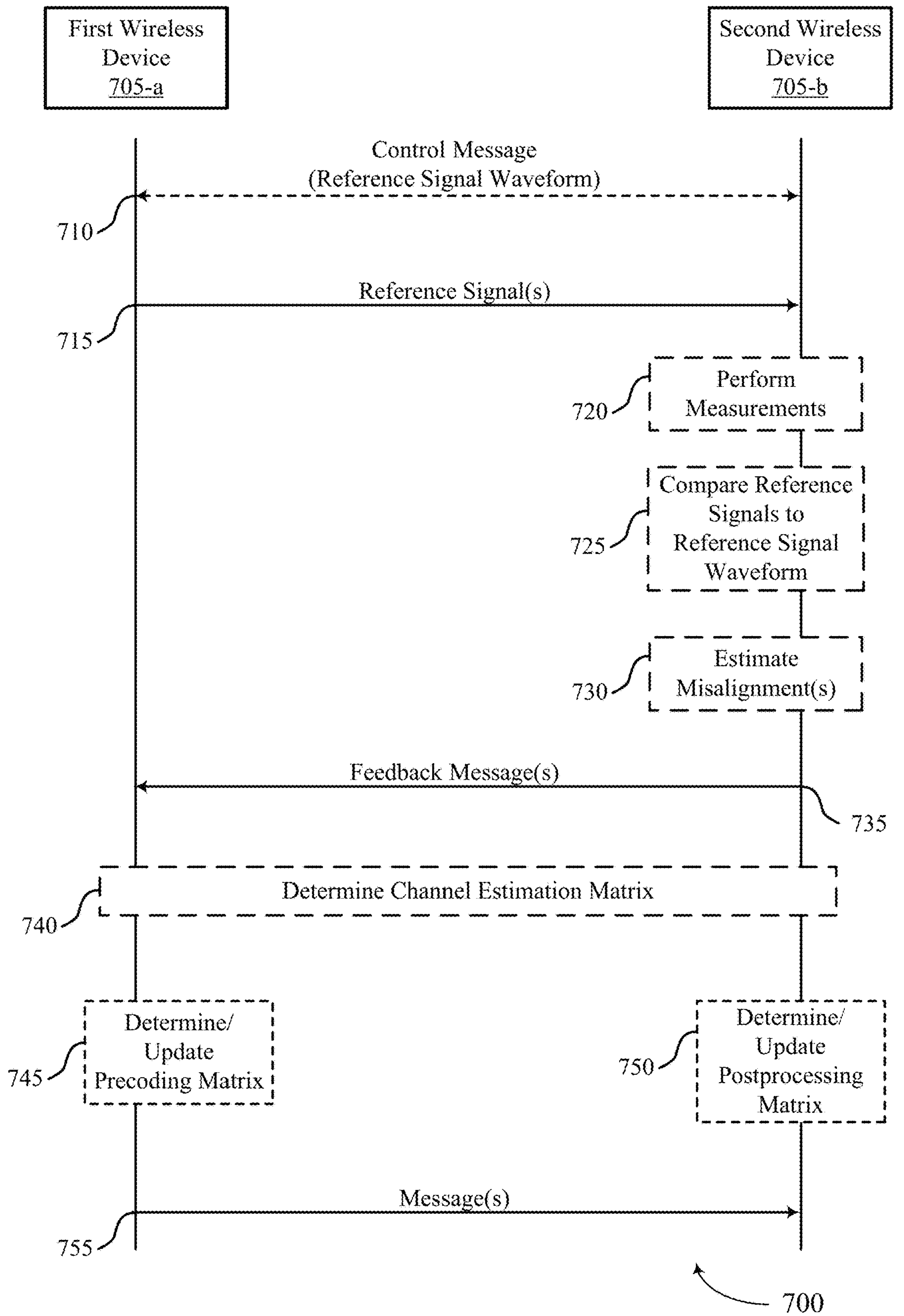
FIG. 7 illustrates an example of a process flow that supports techniques for estimating misalignment between antenna arrays in accordance with one or more aspects of the present disclosure.

FIG. 7 illustrates an example of a process flow 700 that supports techniques for estimating misalignment between antenna arrays in accordance with one or more aspects of the present disclosure. In some examples, aspects of the process flow 700 may implement, or be implemented by, aspects of the wireless communications system 100, the wireless communications system 200, the misalignment configurations 300-600, or any combination thereof. In particular, the process flow 700 illustrates techniques for estimating and compensating for misalignments between antenna arrays, as described with reference to FIGS. 1-6, among other aspects.

The process flow 700 includes a first wireless device 705-*a* and a second wireless device 705-*b*, which may be examples of wireless devices as described herein. For example, the first wireless device 705-*a* and the second wireless device 705-*b* illustrated in FIG. 7 may include examples of the first wireless device 205-*a* and the second wireless device 205-*b*, respectively, as illustrated in FIG. 2. In this regard, the respective wireless devices 705 may include any types of wireless devices, including, but not limited to, network entities 105, UEs 115, IAB nodes, etc.

In some examples, the operations illustrated in process flow 700 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 710, the first wireless device 705-*a* and the second wireless device may communicate (e.g., transmit, receive) a control message (e.g., RRC, DCI, MAC-CE) to/from one another, where the control message indicates a reference signal waveform associated with reference signals (e.g., OAM reference signals) that may be communicated between the respective devices.

At 715, the first wireless device 705-*a* may transmit one or more reference signals (e.g., OAM reference signals) to the second wireless device 705-*b*. For example, the first wireless device 705-*a* may transmit one or more reference signals to the second wireless device 705-*b* in accordance with a first precoder matrix. Similarly, the second wireless device 705-*b* may receive the reference signals using (e.g., in accordance with) a first postprocessing matrix. In some cases, the reference signals may be transmitted at 715 according to the reference signal waveform(s) indicated via the control message at 710.

As described previously herein, the devices may exchange reference signals with one another so that each respective device may locally estimate misalignments between antenna arrays at the respective devices. However, for the purposes of simplicity, the process flow 700 illustrates an example in which the first wireless device 705-*a* transmits reference signals to the second wireless device 705-*b*. In this regard, in some cases, the first wireless device 705-*a* may transmit reference signals to the second wireless device 705-*b* to enable the second wireless device 705-*b* to estimate antenna array misalignments, and the second wireless device 705-*b* may transmit reference signals to the first wireless device 705-*a* to enable the first wireless device 705-*a* to estimate antenna array misalignments.

In some aspects, the first wireless device 705-*a* may transmit multiple different reference signals according to different configurations to enable the second wireless device 705-*b* to measure different types of misalignment, such as rotational misalignment in the X, Y, and/or Z directions, shift misalignment, or any combination thereof.

For example, in order to enable the second wireless device 705-*b* to measure rotational misalignment in the X/Y directions, the first wireless device 705-*a* may transmit reference signals with a same phase across a set of antenna elements of a first antenna array at the first wireless device 705-*a*, and in accordance with the first precoder matrix, as shown in FIG. 3. By way of another example, in order to enable the second wireless device 705-*b* to measure rotational misalignment in the Z directions, the first wireless device 705-*a* devices may transmit reference signals with a phase ramp across the set of antenna elements of the first antenna array at the first wireless device 705-*a*, and in accordance with the first precoder matrix, as shown in FIG. 4.

By way of another example, in order to enable the second wireless device 705-*b* to measure parallel shift misalignment, the first wireless device 705-*a* devices may transmit a first subset of reference signals using a first subset of antenna elements of the first antenna array with a first phase, and may transmit a second subset of reference signals using a second subset of antenna elements of the first antenna array with a second phase that is different from the first phase. For instance, as shown in FIG. 6, the first wireless device 705-*a* may transmit a first subset of reference signals with a first phase S(t), and may transmit a second subset of reference signals with a second phase −S(t) which is associated with an opposite sign (e.g., ±S(t)). Moreover, as described herein, and as illustrated in FIG. 5, transmitting subsets of reference signals with different phases (e.g., opposite signs) may also enable the second wireless device 705-*b* to estimate rotational misalignment with respect to the Z axis.

At 720, the second wireless device 705-*b* may perform measurements on the reference signals received at 715. For example, the second wireless device 705-*b* may perform measurements to estimate a phase of the reference signals received at the respective antenna elements of the antenna array (e.g., estimate phases of reference signals along X, Y, Z directions). Additionally, or alternatively, the second wireless device 705-*b* may perform other types of measurements, such as RSSI, RSRP, RSRQ, SNR, SINR, and the like.

At 725, the second wireless device 705-*b* may compare the received reference signals with the reference signal waveform which was received at 710. In some cases, comparing the reference signals (e.g., phase of the received reference signals) to the reference signal waveform may enable the second wireless device 705-*b* to estimate misalignments between the antenna arrays of the respective devices. In this regard, the second wireless device 705-*b* may compare the reference signals to the reference signal waveform based on the control message at 710, receiving the reference signals at 715, performing the measurements at 720, or any combination thereof.

At 730, the second wireless device 705-*b* may estimate one or more misalignments (e.g., estimated rotational misalignment, estimated spatial misalignment, and the like) between antenna arrays of the respective devices. The second wireless device 705-*b* may estimate the one or more misalignments at 730 based on the control message at 710, receiving the reference signals at 715, performing the measurements at 720, comparing the reference signals to the reference signal waveform at 725, or any combination thereof.

For example, the second wireless device 705-*b* may be configured to estimate rotational misalignment with respect to the X/Y axes in cases where the first wireless device 705-*a* transmits the reference signals with a same phase, as shown in FIG. 3. In such cases, the estimated rotational misalignment may be estimated relative to one or more axes that are perpendicular to an additional axis that extends from the first antenna array of the first wireless device 705-*a* to the second antenna array of the second wireless device 705-*b*.

By way of another example, the second wireless device 705-*b* may be configured to estimate rotational misalignment with respect to the Z axis in cases where the first wireless device 705-*a* transmits the reference signals with a phase ramp, as shown in FIG. 4, and/or in cases where the first wireless device 705-*a* transmits subsets of reference signals with different (e.g., opposite) phase, as shown in FIG. 5. In such cases, the estimated rotational misalignment may be estimated relative to an axis that extends from the Tx antenna array of the first wireless device 705-*a* to the Rx antenna array of the second wireless device 705-*b*.

By way of another example, the second wireless device 705-*b* may be configured to estimate spatial misalignment (e.g., parallel/lateral shift misalignment) axes in cases where the first wireless device 705-*a* transmits subsets of reference signals with different (e.g., opposite) phase, as shown in FIG. 6. In such cases, the estimated spatial misalignment may be estimated relative to one or more axes that are perpendicular to an additional axis that extends from the first antenna array of the first wireless device 705-*a* to the second antenna array of the second wireless device 705-*b*.

At 735, the second wireless device 705-*b* may transmit a feedback message to the first wireless device 705-*a*, where the feedback message indicates one or more misalignments (e.g., estimated rotational misalignment, estimated spatial misalignment, or both) between the first antenna array at the first wireless device 705-*a* and the second antenna array at the second wireless device 705-*b*. In this regard, the second wireless device 705-*b* may transmit the feedback message at 730 based on the control message at 710, receiving the reference signals at 715, performing the measurements at 720, comparing the reference signals to the reference signal waveform at 725, estimating the misalignment(s) at 730, or any combination thereof.

At 740, the first wireless device 705-*a*, the second wireless device 705-*b*, or both, may determine a channel estimation matrix associated with a channel between the first antenna array of the first wireless device 705-*a* and the second antenna array of the second wireless device 705-*b*. In some aspects, the devices may determine the channel estimation matrix based on the estimated misalignment(s) indicated via the feedback message at 735. In this regard, the wireless devices 705 may determine the channel estimation matrix at 740 based on the control message at 710, receiving the reference signals at 715, performing the measurements at 720, comparing the reference signals to the reference signal waveform at 725, estimating the misalignment(s) at 730, communicating the feedback message at 735, or any combination thereof.

At 745, the first wireless device 705-*a* may determine a new precoding matrix that will be used for transmitting signals to the second wireless device 705-*b*. In other words, the first wireless device 705-*a* may update/modify the first precoding matrix which was used to transmit the reference signals at 715 to generate a second precoding matrix. In particular, the first wireless device 705-*a* may update/modify the first precoding matrix based on the estimated rotational misalignment, the estimated spatial misalignment (e.g., parallel/lateral shift misalignment) which was indicated via the feedback message at 735.

In this regard, the first wireless device 705-*a* may modify/update the precoding matrix at 745 based on the control message at 710, transmitting the reference signals at 715, receiving the feedback message at 735, determining the channel estimation matrix at 740, or any combination thereof. For example, in some cases, the first wireless device 705-*a* may modify the first precoding matrix to generate the second (modified) precoding matrix based on the channel estimation matrix determined at 740.

At 750, the second wireless device 705-*b* may determine a new postprocessing matrix that will be used for receiving signals from the first wireless device 705-*a*. In other words, the second wireless device 705-*b* may update/modify the first postprocessing matrix which was used to receive the reference signals at 715 to generate a second postprocessing matrix. In particular, the second wireless device 705-*b* may update/modify the first postprocessing matrix based on the estimated rotational misalignment, the estimated spatial misalignment (e.g., parallel/lateral shift misalignment) which was indicated via the feedback message at 735.

In this regard, the second wireless device 705-*b* may modify/update the postprocessing matrix at 750 based on the control message at 710, receiving the reference signals at 715, performing the measurements at 720, comparing the reference signals to the reference signal waveform at 725, estimating the misalignment(s) at 730, transmitting the feedback message at 735, determining the channel estimation matrix at 740, or any combination thereof. For example, in some cases, the second wireless device 705-*b* may modify the first postprocessing matrix to generate the second (modified) postprocessing matrix based on the channel estimation matrix determined at 740.

At 755, the first wireless device 705-*a* may transmit a message (e.g., data message, reference signal, etc.) to the second wireless device 705-*b* using (e.g., in accordance with) the second precoder matrix which was determined at 745. Similarly, the second wireless device 705-*b* may receive the message from the first wireless device 705-*a* using (e.g., in accordance with) the second postprocessing matrix which was determined at 750.

In some implementations, the steps/operations shown in process flow 700 may be repeated multiple times in order to iteratively estimate misalignments between the antenna arrays, and update precoding and postprocessing matrices used for communications between the respective devices. In some cases, the process for estimating misalignment may occur a pre-defined number of times, over a predetermined time interval/duration, and/or until estimated misalignments are sufficiently small (e.g., less than some threshold).

While process flow 700 is shown and described in the context of the first wireless device 705-*a* as the "Tx device" and the second wireless device 705-*b* as the "Rx device," this is solely for illustrative purposes, and is not to be regarded as a limitation of the present disclosure. In particular, in some implementations, the process flow 700 illustrated in FIG. 7 may be reversed in order to enable the first wireless device 705-*a* to estimate misalignments between antenna arrays. In such cases, the second wireless device 705-*b* may transmit reference signals to the first wireless device 705-*a* (e.g., step 715), and the first wireless device 705-*a* may perform measurements (e.g., step 720), compare the reference signals (e.g., step 725), estimate misalignments (e.g., step 730), and transmit a feedback message indicating estimated misalignments (e.g., step 740). In such cases, the second wireless device 705-*b* may update a precoding matrix (e.g., step 745), and the first wireless device 705-*a* may update a postprocessing matrix (e.g., step 750), as described herein.

Techniques described herein may enable the wireless devices 705 to estimate misalignments between antenna arrays, and compensate for such misalignments to improve an efficiency and reliability of wireless communications. In particular, techniques described herein may enable the wireless devices 705 to exchange reference signals (e.g., OAM waveforms) with one another using defined phase configurations (e.g., common phases, phase ramps, etc.) that enable the other respective devices to estimate rotational and/or translational shift misalignments. By enabling the wireless devices 705 to estimate misalignments, the respective devices may be able to update precoding and postprocessing matrices used to transmit and receive signals between the devices. As such, techniques described herein may improve an efficiency and reliability of wireless communications exchanged between the wireless devices 705, thereby reducing the quantity/proportion of retransmissions and leading to improved resource utilization and reduced power consumption.

Figure 8:
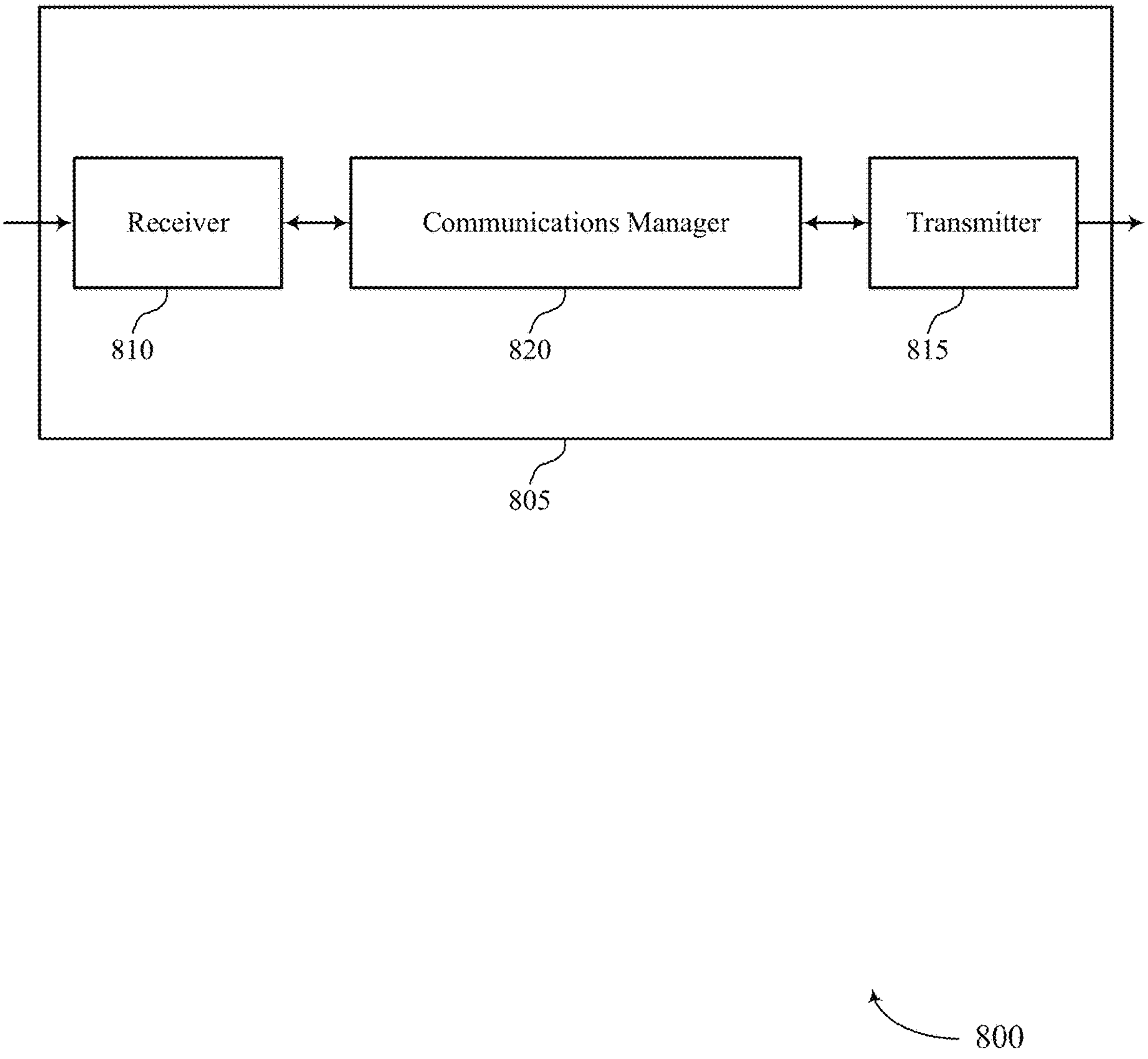
FIGS. 8 and 9 show block diagrams of devices that support techniques for estimating misalignment between antenna arrays in accordance with one or more aspects of the present disclosure.

FIG. 8 shows a block diagram 800 of a device 805 that supports techniques for estimating misalignment between antenna arrays in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for estimating misalignment between antenna arrays as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for transmitting one or more reference signals to a second wireless device using a first antenna array at the first wireless device and in accordance with a first precoder matrix. The communications manager 820 may be configured as or otherwise support a means for receiving, from the second wireless device based on the one or more reference signals, a feedback message indicating an estimated rotational misalignment, an estimated spatial misalignment, or both, between the first antenna array at the first wireless device and a second antenna array at the second wireless device. The communications manager 820 may be configured as or otherwise support a means for transmitting a message to the second wireless device in accordance with a second precoder matrix that is modified relative to the first precoder matrix based on the estimated rotational misalignment, the estimated spatial misalignment, or both.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable wireless devices to estimate misalignments between antenna arrays, and compensate for such misalignments to improve an efficiency and reliability of wireless communications. In particular, techniques described herein may enable wireless devices to exchange reference signals (e.g., OAM waveforms) with one another using defined phase configurations (e.g., common phases, phase ramps, etc.) that enable the other respective devices to estimate rotational and/or translational shift misalignments. By enabling wireless devices to estimate misalignments, the respective devices may be able to update precoding and postprocessing matrices used to transmit and receive signals between the devices. As such, techniques described herein may improve an efficiency and reliability of wireless communications exchanged between devices, thereby reducing the quantity/proportion of retransmissions and leading to improved resource utilization and reduced power consumption.

Figure 9:
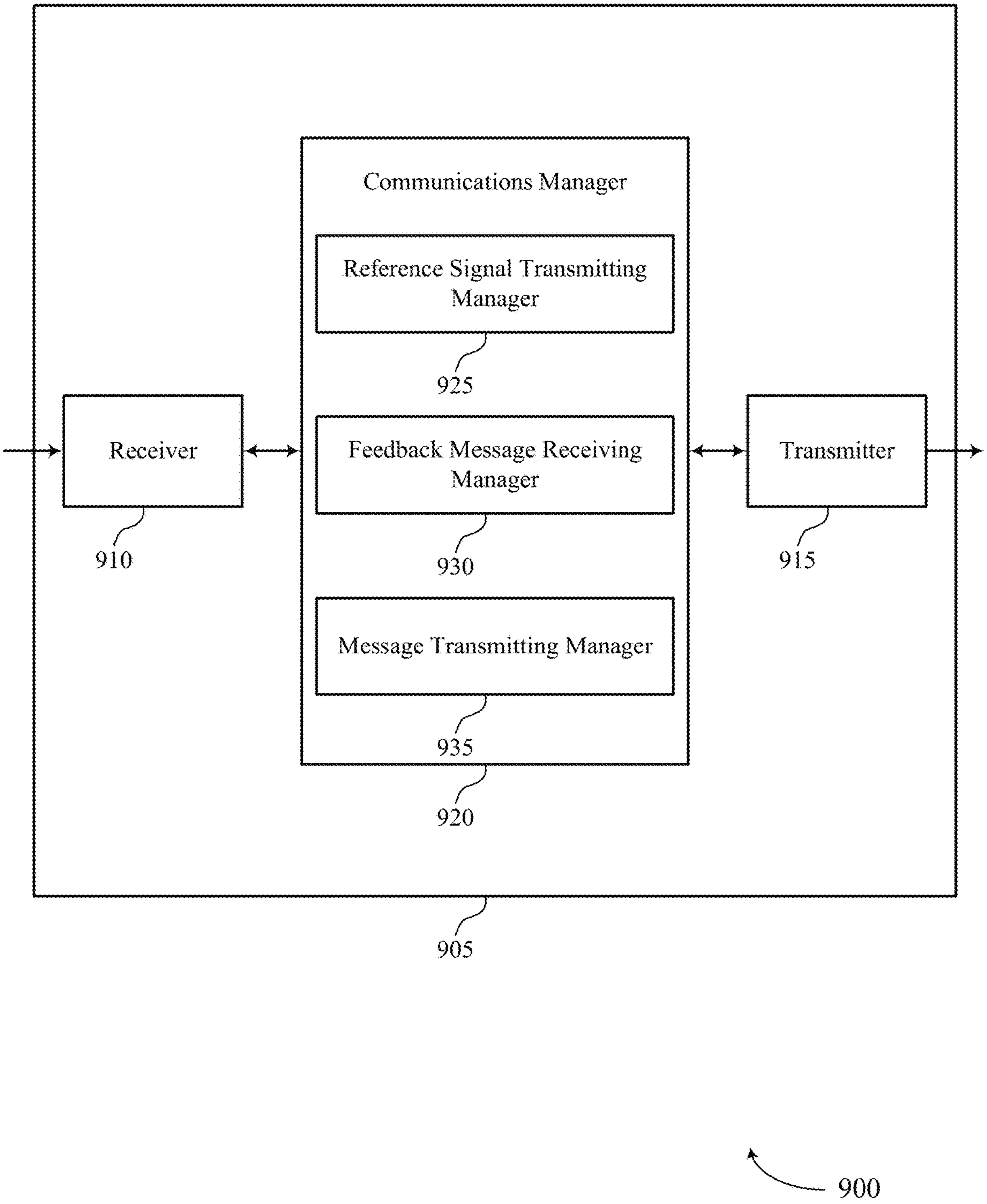

FIG. 9 shows a block diagram 900 of a device 905 that supports techniques for estimating misalignment between antenna arrays in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for estimating misalignment between antenna arrays as described herein. For example, the communications manager 920 may include a reference signal transmitting manager 925, a feedback message receiving manager 930, a message transmitting manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The reference signal transmitting manager 925 may be configured as or otherwise support a means for transmitting one or more reference signals to a second wireless device using a first antenna array at the first wireless device and in accordance with a first precoder matrix. The feedback message receiving manager 930 may be configured as or otherwise support a means for receiving, from the second wireless device based on the one or more reference signals, a feedback message indicating an estimated rotational misalignment, an estimated spatial misalignment, or both, between the first antenna array at the first wireless device and a second antenna array at the second wireless device. The message transmitting manager 935 may be configured as or otherwise support a means for transmitting a message to the second wireless device in accordance with a second precoder matrix that is modified relative to the first precoder matrix based on the estimated rotational misalignment, the estimated spatial misalignment, or both.

Figure 10:
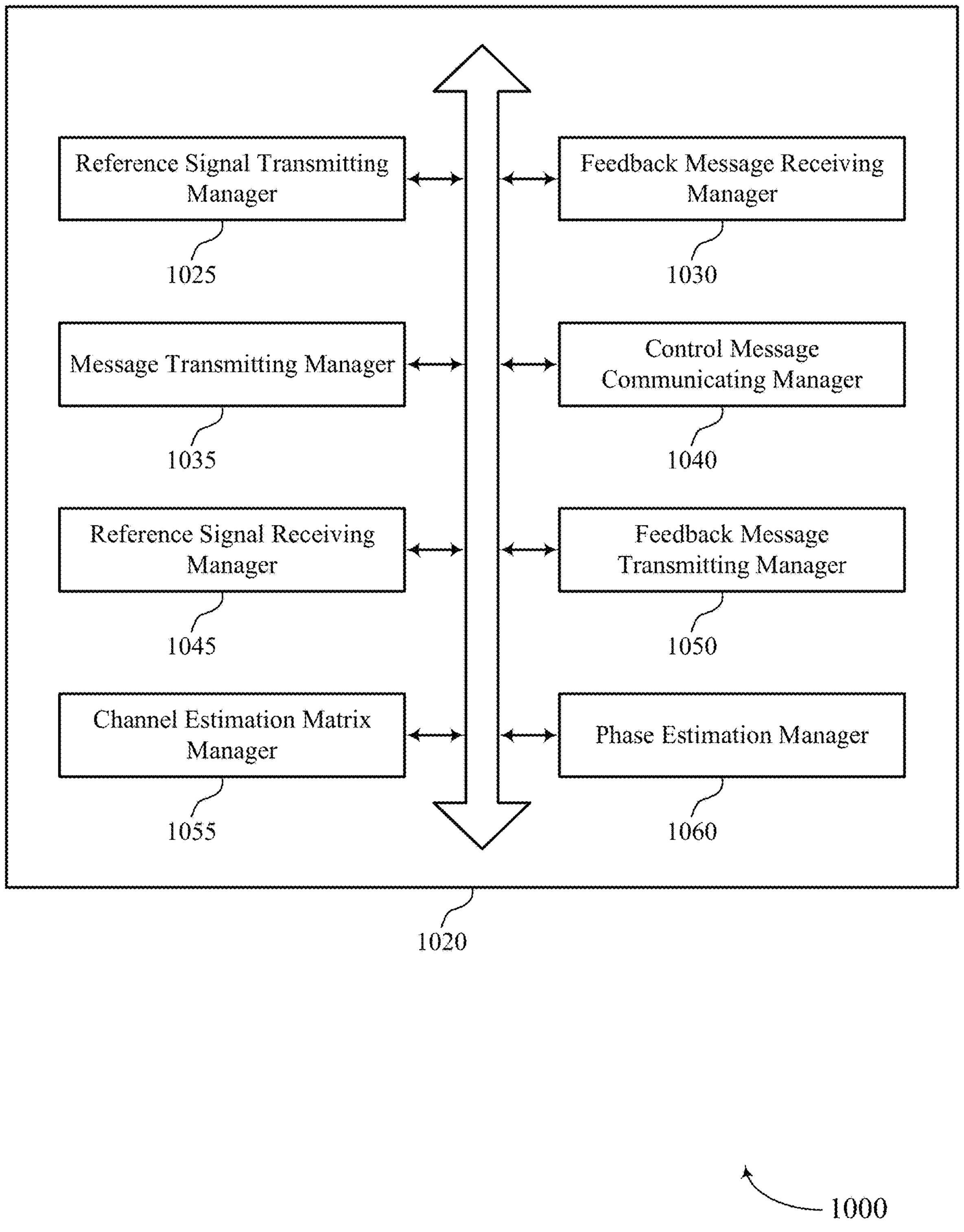
FIG. 10 shows a block diagram of a communications manager that supports techniques for estimating misalignment between antenna arrays in accordance with one or more aspects of the present disclosure.

FIG. 10 shows a block diagram 1000 of a communications manager 1020 that supports techniques for estimating misalignment between antenna arrays in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for estimating misalignment between antenna arrays as described herein. For example, the communications manager 1020 may include a reference signal transmitting manager 1025, a feedback message receiving manager 1030, a message transmitting manager 1035, a control message communicating manager 1040, a reference signal receiving manager 1045, a feedback message transmitting manager 1050, a channel estimation matrix manager 1055, a phase estimation manager 1060, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The reference signal transmitting manager 1025 may be configured as or otherwise support a means for transmitting one or more reference signals to a second wireless device using a first antenna array at the first wireless device and in accordance with a first precoder matrix. The feedback message receiving manager 1030 may be configured as or otherwise support a means for receiving, from the second wireless device based on the one or more reference signals, a feedback message indicating an estimated rotational misalignment, an estimated spatial misalignment, or both, between the first antenna array at the first wireless device and a second antenna array at the second wireless device. The message transmitting manager 1035 may be configured as or otherwise support a means for transmitting a message to the second wireless device in accordance with a second precoder matrix that is modified relative to the first precoder matrix based on the estimated rotational misalignment, the estimated spatial misalignment, or both.

In some examples, the reference signal transmitting manager 1025 may be configured as or otherwise support a means for transmitting the one or more reference signals with a same phase across a set of multiple antenna elements of the first antenna array in accordance with the first precoder matrix, where the estimated rotational misalignment is based on transmitting the one or more reference signals with the same phase. In some examples, the estimated rotational misalignment is estimated relative to one or more axes that are perpendicular to an additional axis that extends from the first antenna array to the second antenna array.

In some examples, the reference signal transmitting manager 1025 may be configured as or otherwise support a means for transmitting the one or more reference signals with a phase ramp across a set of multiple antenna elements of the first antenna array in accordance with the first precoder matrix, where the estimated rotational misalignment is based on transmitting the one or more reference signals with the phase ramp. In some examples, the estimated rotational misalignment is estimated relative to an axis that extends from the first antenna array to the second antenna array.

In some examples, the reference signal transmitting manager 1025 may be configured as or otherwise support a means for transmitting a first subset of reference signals of the one or more reference signals via a first subset of antenna elements of the first antenna array, where the first subset of reference signals are transmitted with a first phase. In some examples, the reference signal transmitting manager 1025 may be configured as or otherwise support a means for transmitting a second subset of reference signals of the one or more reference signals via a second subset of antenna elements of the first antenna array, where the second subset of reference signals are transmitted with a second phase that is different from the first phase, where the estimated spatial misalignment is based on transmitting the first subset of reference signals with the first phase and transmitting the second subset of reference signals with the second phase.

In some examples, the second phase includes an opposite sign compared to the first phase. In some examples, the estimated spatial misalignment is estimated relative to one or more axes that are perpendicular to an additional axis that extends from the first antenna array to the second antenna array.

In some examples, the control message communicating manager 1040 may be configured as or otherwise support a means for communicating a control message indicating a reference signal waveform, where one or more reference signals are transmitted in accordance with the reference signal waveform.

In some examples, the reference signal receiving manager 1045 may be configured as or otherwise support a means for receiving one or more additional reference signals from the second wireless device using the first antenna array. In some examples, the feedback message transmitting manager 1050 may be configured as or otherwise support a means for transmitting, to the second wireless device based on the one or more additional reference signals, a second feedback message indicating a second estimated rotational misalignment, a second estimated spatial misalignment, or both, between the first antenna array at the first wireless device and the second antenna array at the second wireless device, where the second precoder matrix is modified relative to the first precoder matrix based on the second estimated rotational misalignment, the second estimated spatial misalignment, or both.

In some examples, the reference signal receiving manager 1045 may be configured as or otherwise support a means for performing measurements on the one or more additional reference signals, where the second estimated rotational misalignment, the second estimated spatial misalignment, or both, is based on the measurements.

In some examples, the phase estimation manager 1060 may be configured as or otherwise support a means for estimating a set of multiple phases associated with the one or more additional reference signals along a second axis, a third axis, or both, where the second axis and the third axis are perpendicular to the first axis, and where the second estimated rotational misalignment is based on the set of multiple phases.

In some examples, the reference signal receiving manager 1045 may be configured as or otherwise support a means for comparing the one or more additional reference signals with a reference signal waveform, where the second estimated rotational misalignment, the second estimated spatial misalignment, or both, is based on the comparing.

In some examples, the channel estimation matrix manager 1055 may be configured as or otherwise support a means for determining a channel estimation matrix associated with a channel between the first antenna array and the second antenna array based on the estimated rotational misalignment, an estimated spatial misalignment, or both, where the second precoder matrix is modified relative to the first precoder matrix based on the channel estimation matrix. In some examples, the estimated spatial misalignment includes a parallel shift misalignment along one or more axes relative to the first antenna array, the second antenna array, or both.

Figure 11:
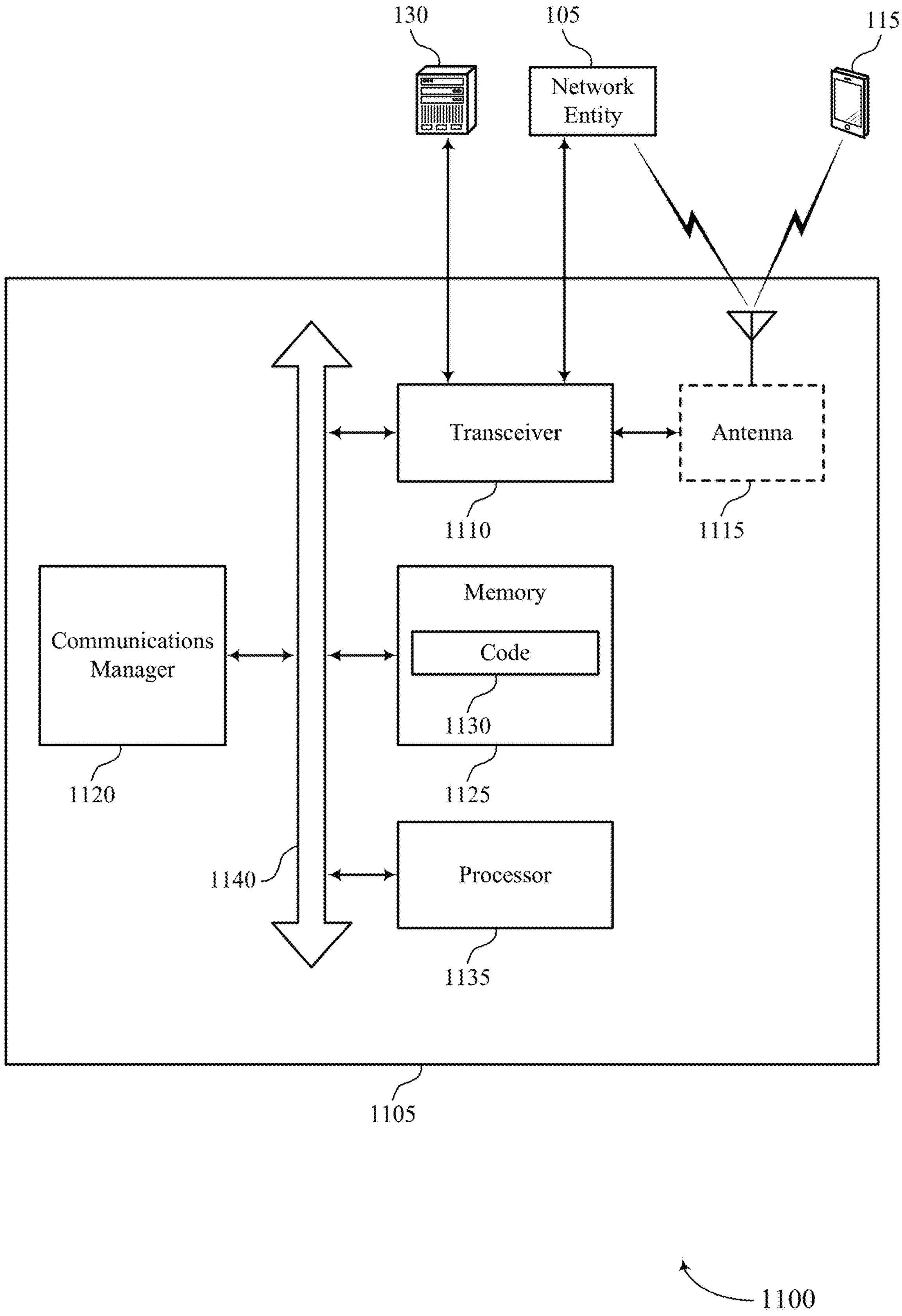
FIG. 11 shows a diagram of a system including a device that supports techniques for estimating misalignment between antenna arrays in accordance with one or more aspects of the present disclosure.

FIG. 11 shows a diagram of a system 1100 including a device 1105 that supports techniques for estimating misalignment between antenna arrays in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for estimating misalignment between antenna arrays). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

For example, the communications manager 1120 may be configured as or otherwise support a means for transmitting one or more reference signals to a second wireless device using a first antenna array at the first wireless device and in accordance with a first precoder matrix. The communications manager 1120 may be configured as or otherwise support a means for receiving, from the second wireless device based on the one or more reference signals, a feedback message indicating an estimated rotational misalignment, an estimated spatial misalignment, or both, between the first antenna array at the first wireless device and a second antenna array at the second wireless device. The communications manager 1120 may be configured as or otherwise support a means for transmitting a message to the second wireless device in accordance with a second precoder matrix that is modified relative to the first precoder matrix based on the estimated rotational misalignment, the estimated spatial misalignment, or both.

By including or configuring the communications manager 1120 in accordance with examples as described herein, the device 1105 may support techniques that enable wireless devices to estimate misalignments between antenna arrays, and compensate for such misalignments to improve an efficiency and reliability of wireless communications. In particular, techniques described herein may enable wireless devices to exchange reference signals (e.g., OAM waveforms) with one another using defined phase configurations (e.g., common phases, phase ramps, etc.) that enable the other respective devices to estimate rotational and/or translational shift misalignments. By enabling wireless devices to estimate misalignments, the respective devices may be able to update precoding and postprocessing matrices used to transmit and receive signals between the devices. As such, techniques described herein may improve an efficiency and reliability of wireless communications exchanged between devices, thereby reducing the quantity/proportion of retransmissions and leading to improved resource utilization and reduced power consumption.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of techniques for estimating misalignment between antenna arrays as described herein, or the processor 1135 and the memory 1125 may be otherwise configured to perform or support such operations.

Figure 12:
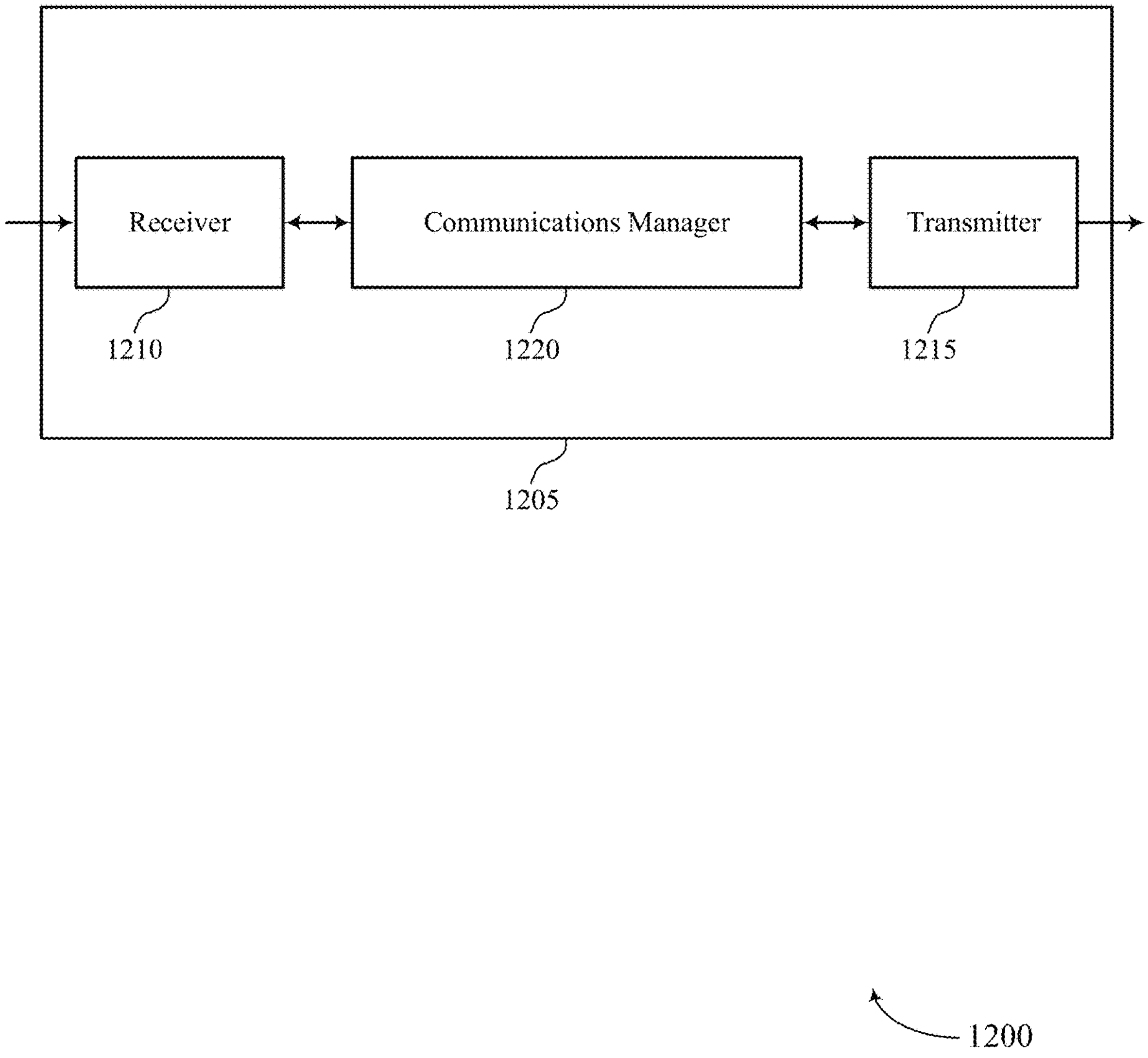
FIGS. 12 and 13 show block diagrams of devices that support techniques for estimating misalignment between antenna arrays in accordance with one or more aspects of the present disclosure.

FIG. 12 shows a block diagram 1200 of a device 1205 that supports techniques for estimating misalignment between antenna arrays in accordance with one or more aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for estimating misalignment between antenna arrays). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for estimating misalignment between antenna arrays). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for estimating misalignment between antenna arrays as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

For example, the communications manager 1220 may be configured as or otherwise support a means for receiving one or more reference signals from a first wireless device using a second antenna array at the second wireless device and in accordance with a first postprocessing matrix. The communications manager 1220 may be configured as or otherwise support a means for transmitting, to the first wireless device based on the one or more reference signals, a feedback message indicating an estimated rotational misalignment, an estimated spatial misalignment, or both, between the second antenna array at the second wireless device and a first antenna array at the first wireless device. The communications manager 1220 may be configured as or otherwise support a means for receiving a message from the first wireless device in accordance with a second postprocessing matrix that is modified relative to the first postprocessing matrix based on the estimated rotational misalignment, the estimated spatial misalignment, or both.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques that enable wireless devices to estimate misalignments between antenna arrays, and compensate for such misalignments to improve an efficiency and reliability of wireless communications. In particular, techniques described herein may enable wireless devices to exchange reference signals (e.g., OAM waveforms) with one another using defined phase configurations (e.g., common phases, phase ramps, etc.) that enable the other respective devices to estimate rotational and/or translational shift misalignments. By enabling wireless devices to estimate misalignments, the respective devices may be able to update precoding and postprocessing matrices used to transmit and receive signals between the devices. As such, techniques described herein may improve an efficiency and reliability of wireless communications exchanged between devices, thereby reducing the quantity/proportion of retransmissions and leading to improved resource utilization and reduced power consumption.

Figure 13:
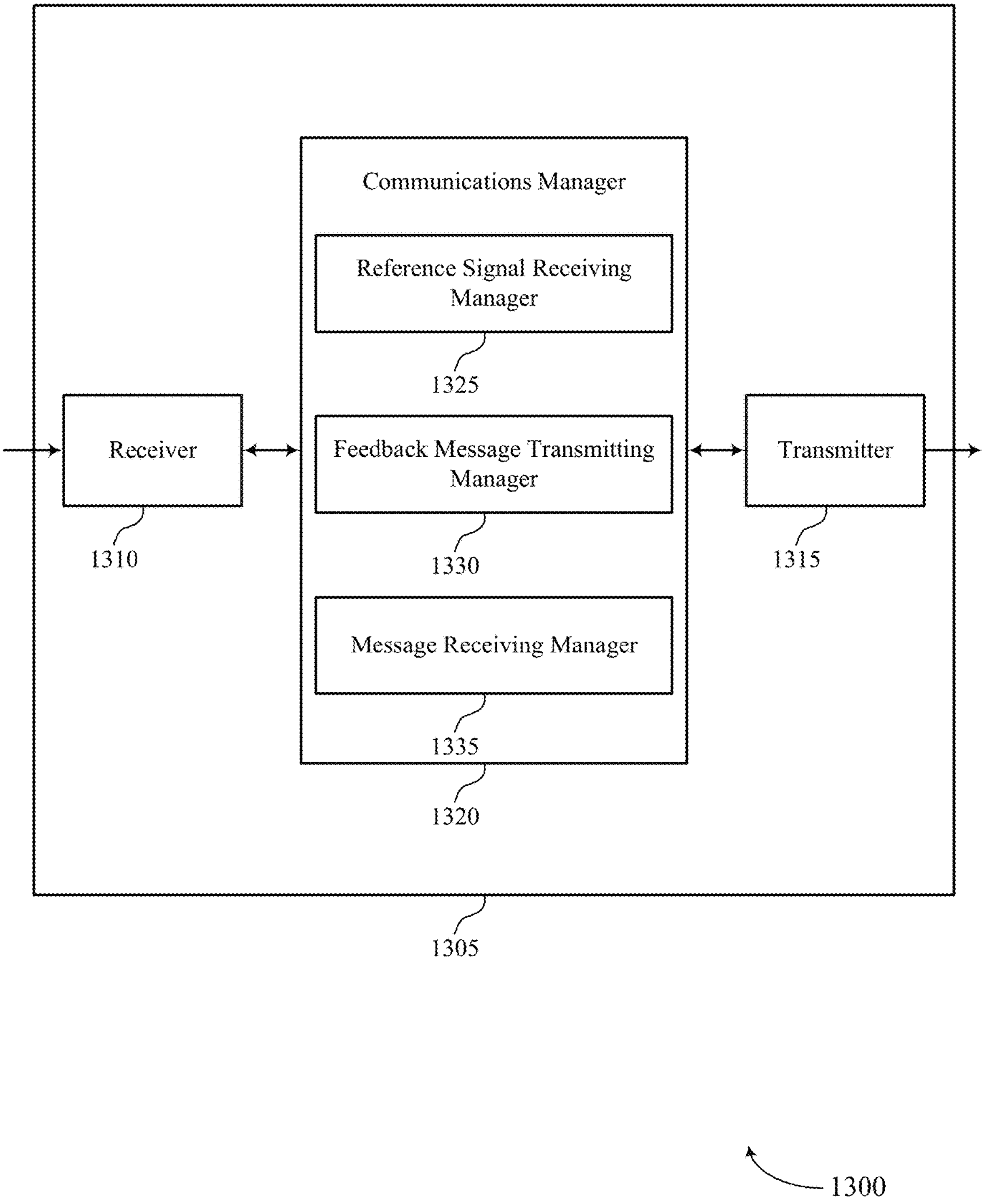

FIG. 13 shows a block diagram 1300 of a device 1305 that supports techniques for estimating misalignment between antenna arrays in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for estimating misalignment between antenna arrays). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for estimating misalignment between antenna arrays). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for estimating misalignment between antenna arrays as described herein. For example, the communications manager 1320 may include a reference signal receiving manager 1325, a feedback message transmitting manager 1330, a message receiving manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The reference signal receiving manager 1325 may be configured as or otherwise support a means for receiving one or more reference signals from a first wireless device using a second antenna array at the second wireless device and in accordance with a first postprocessing matrix. The feedback message transmitting manager 1330 may be configured as or otherwise support a means for transmitting, to the first wireless device based on the one or more reference signals, a feedback message indicating an estimated rotational misalignment, an estimated spatial misalignment, or both, between the second antenna array at the second wireless device and a first antenna array at the first wireless device. The message receiving manager 1335 may be configured as or otherwise support a means for receiving a message from the first wireless device in accordance with a second postprocessing matrix that is modified relative to the first postprocessing matrix based on the estimated rotational misalignment, the estimated spatial misalignment, or both.

Figure 14:
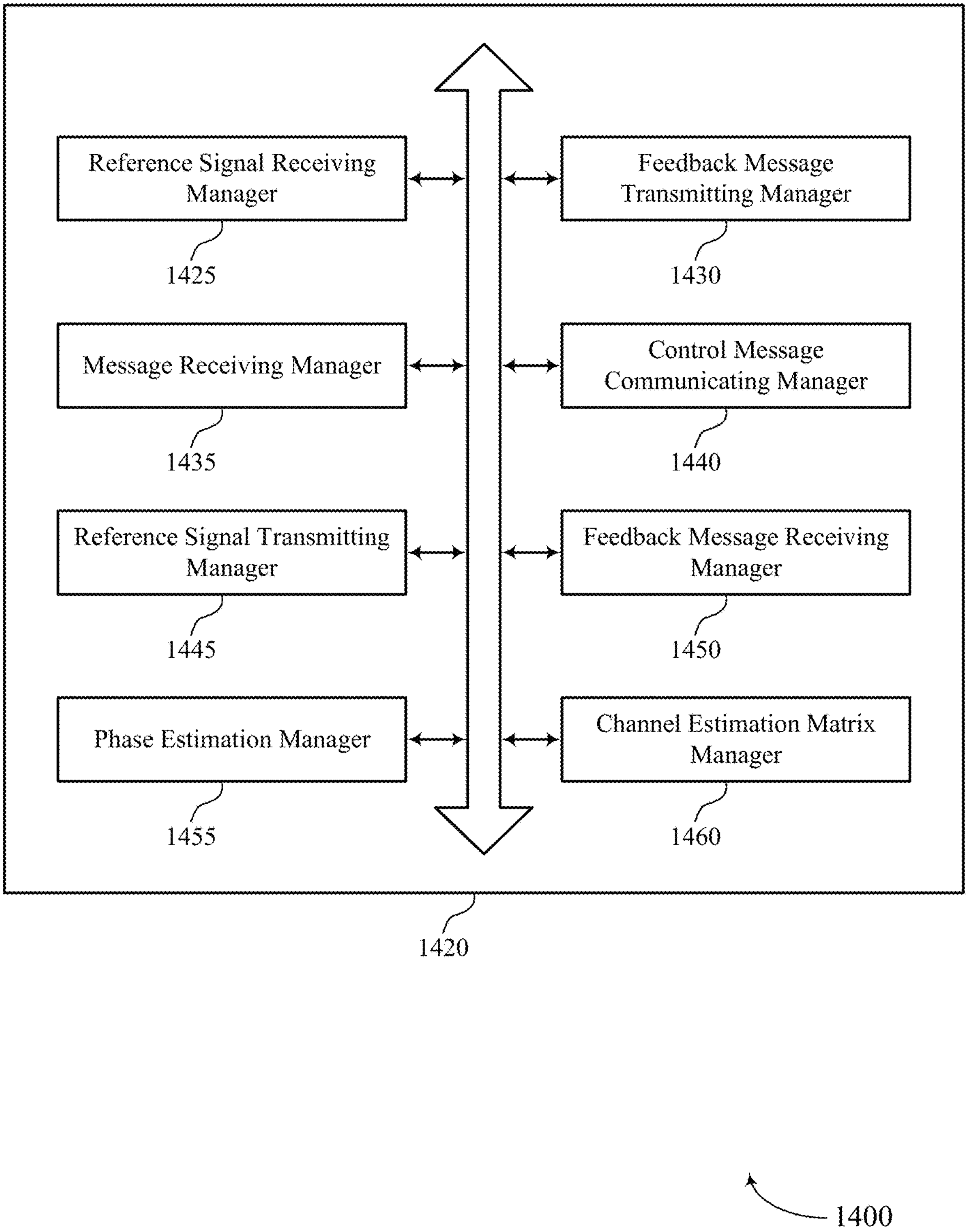
FIG. 14 shows a block diagram of a communications manager that supports techniques for estimating misalignment between antenna arrays in accordance with one or more aspects of the present disclosure.

FIG. 14 shows a block diagram 1400 of a communications manager 1420 that supports techniques for estimating misalignment between antenna arrays in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for estimating misalignment between antenna arrays as described herein. For example, the communications manager 1420 may include a reference signal receiving manager 1425, a feedback message transmitting manager 1430, a message receiving manager 1435, a control message communicating manager 1440, a reference signal transmitting manager 1445, a feedback message receiving manager 1450, a phase estimation manager 1455, a channel estimation matrix manager 1460, or any combination thereof. Each of these components may communicate, directly or indirectly, with one another (e.g., via one or more buses).

The reference signal receiving manager 1425 may be configured as or otherwise support a means for receiving one or more reference signals from a first wireless device using a second antenna array at the second wireless device and in accordance with a first postprocessing matrix. The feedback message transmitting manager 1430 may be configured as or otherwise support a means for transmitting, to the first wireless device based on the one or more reference signals, a feedback message indicating an estimated rotational misalignment, an estimated spatial misalignment, or both, between the second antenna array at the second wireless device and a first antenna array at the first wireless device. The message receiving manager 1435 may be configured as or otherwise support a means for receiving a message from the first wireless device in accordance with a second postprocessing matrix that is modified relative to the first postprocessing matrix based on the estimated rotational misalignment, the estimated spatial misalignment, or both.

In some examples, the estimated rotational misalignment is estimated relative to one or more axes that are perpendicular to an additional axis that extends from the first antenna array to the second antenna array. In some examples, the estimated rotational misalignment is estimated relative to an axis that extends from the first antenna array to the second antenna array. In some examples, the estimated spatial misalignment is estimated relative to one or more axes that are perpendicular to an additional axis that extends from the first antenna array to the second antenna array.

In some examples, the control message communicating manager 1440 may be configured as or otherwise support a means for communicating a control message indicating a reference signal waveform, where one or more reference signals are communicated in accordance with the reference signal waveform.

In some examples, the reference signal transmitting manager 1445 may be configured as or otherwise support a means for transmitting one or more additional reference signals to the first wireless device using the second antenna array. In some examples, the feedback message receiving manager 1450 may be configured as or otherwise support a means for receiving, from the first wireless device based on the one or more additional reference signals, a second feedback message indicating a second estimated rotational misalignment, a second estimated spatial misalignment, or both, between the first antenna array at the first wireless device and the second antenna array at the second wireless device, where the second postprocessing matrix is modified relative to the first postprocessing matrix based on the second estimated rotational misalignment, the second estimated spatial misalignment, or both.

In some examples, the reference signal receiving manager 1425 may be configured as or otherwise support a means for performing measurements on the one or more reference signals, where the estimated rotational misalignment, the estimated spatial misalignment, or both, is based on the measurements.

In some examples, the phase estimation manager 1455 may be configured as or otherwise support a means for estimating a set of multiple phases associated with the one or more reference signals along a second axis, a third axis, or both, where the second axis and the third axis are perpendicular to the first axis, and where the estimated rotational misalignment is based on the set of multiple phases.

In some examples, the reference signal receiving manager 1425 may be configured as or otherwise support a means for comparing the one or more reference signals with a reference signal waveform, where the estimated rotational misalignment, the estimated spatial misalignment, or both, is based on the comparing.

In some examples, the channel estimation matrix manager 1460 may be configured as or otherwise support a means for determining a channel estimation matrix associated with a channel between the first antenna array and the second antenna array based on the estimated rotational misalignment, an estimated spatial misalignment, or both, where the second postprocessing matrix is modified relative to the first postprocessing matrix based on the channel estimation matrix. In some examples, the estimated spatial misalignment includes a parallel shift misalignment along one or more axes relative to the first antenna array, the second antenna array, or both.

Figure 15:
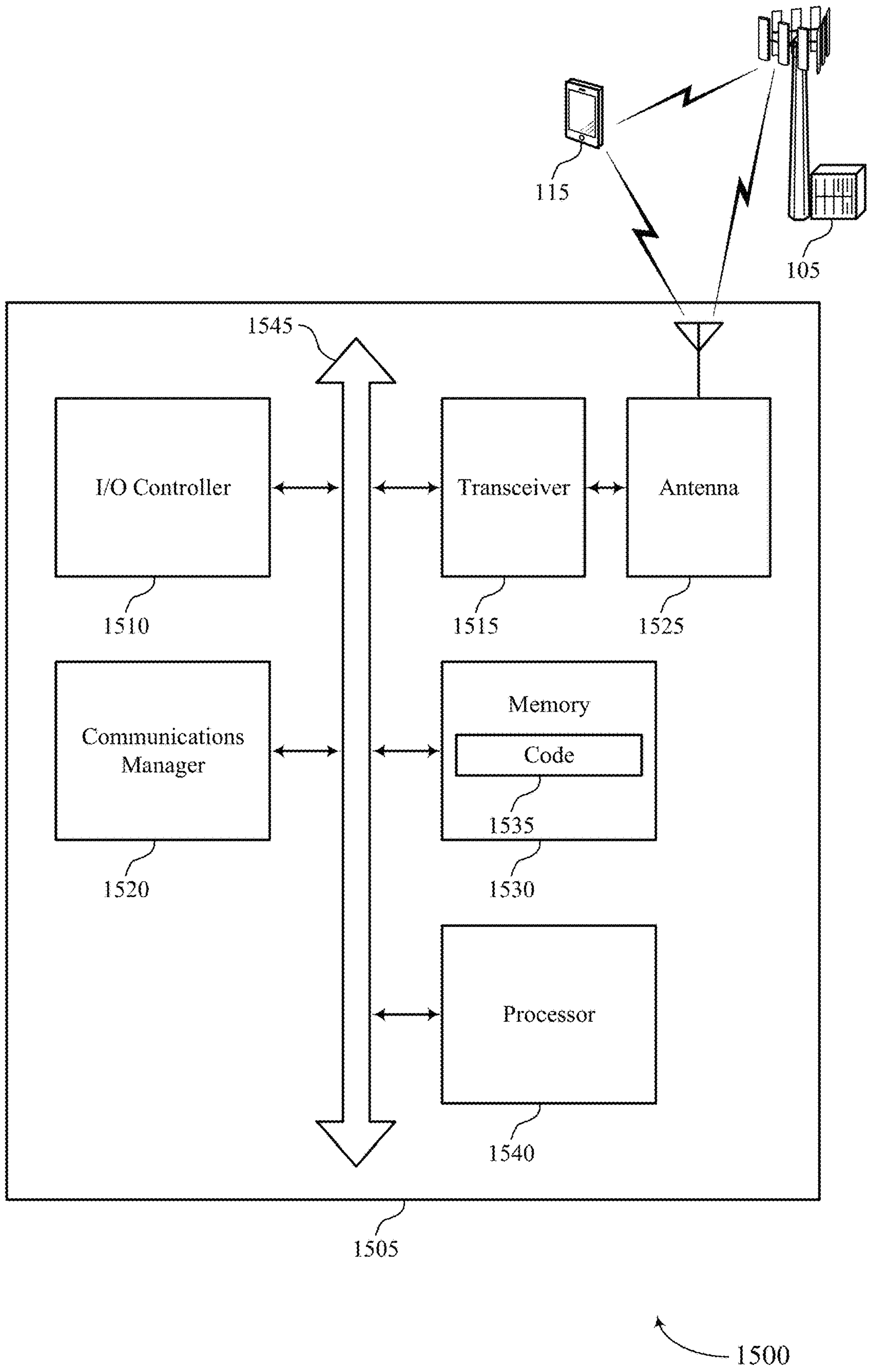
FIG. 15 shows a diagram of a system including a device that supports techniques for estimating misalignment between antenna arrays in accordance with one or more aspects of the present disclosure.

FIG. 15 shows a diagram of a system 1500 including a device 1505 that supports techniques for estimating misalignment between antenna arrays in accordance with one or more aspects of the present disclosure. The device 1505 may be an example of or include the components of a device 1205, a device 1305, or a UE 115 as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for estimating misalignment between antenna arrays). For example, the device 1505 or a component of the device 1505 may include a processor 1540 and memory 1530 coupled with or to the processor 1540, the processor 1540 and memory 1530 configured to perform various functions described herein.

For example, the communications manager 1520 may be configured as or otherwise support a means for receiving one or more reference signals from a first wireless device using a second antenna array at the second wireless device and in accordance with a first postprocessing matrix. The communications manager 1520 may be configured as or otherwise support a means for transmitting, to the first wireless device based on the one or more reference signals, a feedback message indicating an estimated rotational misalignment, an estimated spatial misalignment, or both, between the second antenna array at the second wireless device and a first antenna array at the first wireless device. The communications manager 1520 may be configured as or otherwise support a means for receiving a message from the first wireless device in accordance with a second postprocessing matrix that is modified relative to the first postprocessing matrix based on the estimated rotational misalignment, the estimated spatial misalignment, or both.

By including or configuring the communications manager 1520 in accordance with examples as described herein, the device 1505 may support techniques that enable wireless devices to estimate misalignments between antenna arrays, and compensate for such misalignments to improve an efficiency and reliability of wireless communications. In particular, techniques described herein may enable wireless devices to exchange reference signals (e.g., OAM waveforms) with one another using defined phase configurations (e.g., common phases, phase ramps, etc.) that enable the other respective devices to estimate rotational and/or translational shift misalignments. By enabling wireless devices to estimate misalignments, the respective devices may be able to update precoding and postprocessing matrices used to transmit and receive signals between the devices. As such, techniques described herein may improve an efficiency and reliability of wireless communications exchanged between devices, thereby reducing the quantity/proportion of retransmissions and leading to improved resource utilization and reduced power consumption.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for estimating misalignment between antenna arrays as described herein, or the processor 1540 and the memory 1530 may be otherwise configured to perform or support such operations.

Figure 16:
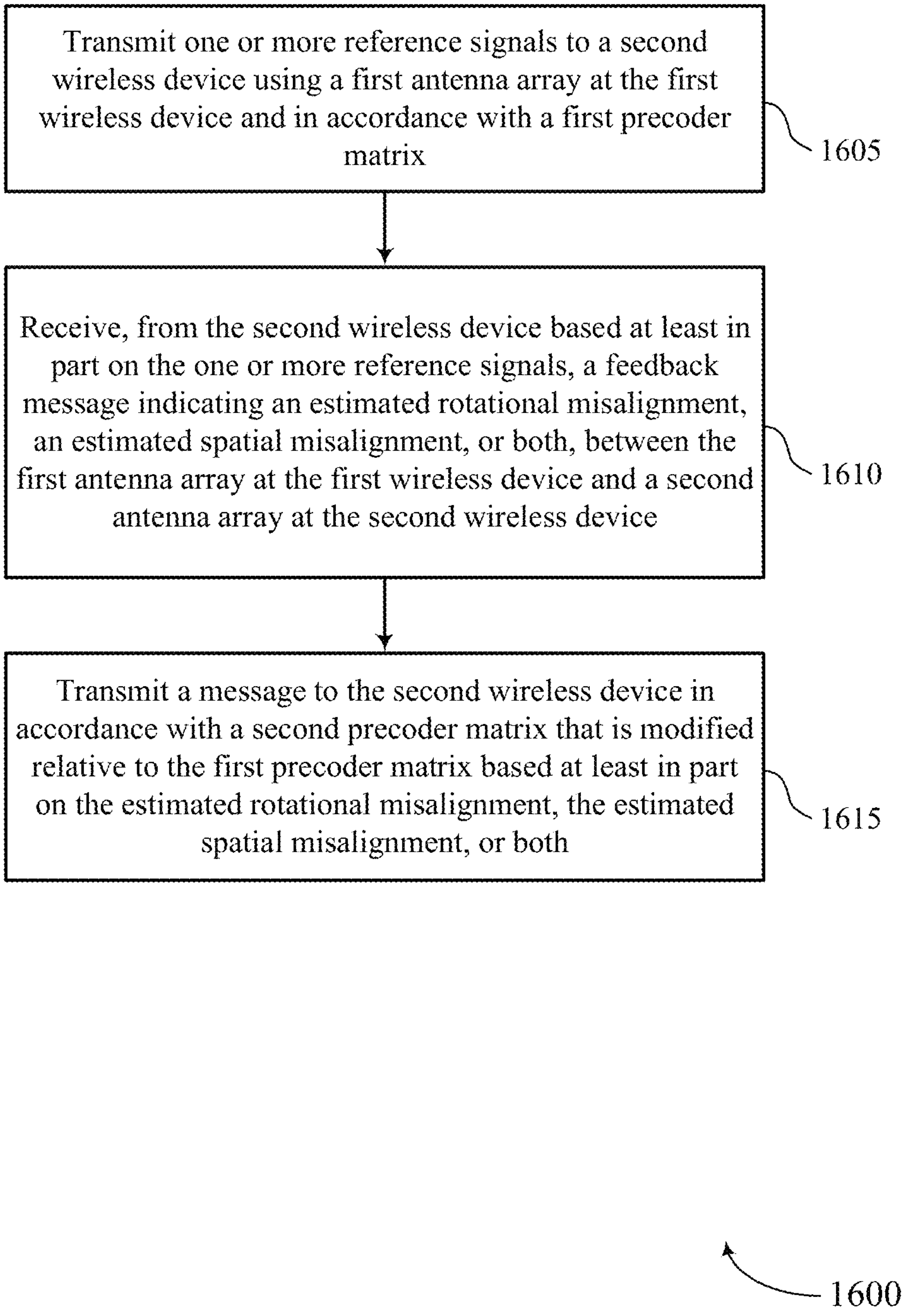
FIGS. 16 and 17 show flowcharts illustrating methods that support techniques for estimating misalignment between antenna arrays in accordance with one or more aspects of the present disclosure.

FIG. 16 shows a flowchart illustrating a method 1600 that supports techniques for estimating misalignment between antenna arrays in accordance with one or more aspects of the present disclosure. The operations of the method 1600 may be implemented by a network entity or its components as described herein. For example, the operations of the method 1600 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting one or more reference signals to a second wireless device using a first antenna array at the first wireless device and in accordance with a first precoder matrix. The operations of 1605 may be performed in accordance with examples as disclosed herein. In some examples, aspects of the operations of 1605 may be performed by a reference signal transmitting manager 1025 as described with reference to FIG. 10.

At 1610, the method may include receiving, from the second wireless device based on the one or more reference signals, a feedback message indicating an estimated rotational misalignment, an estimated spatial misalignment, or both, between the first antenna array at the first wireless device and a second antenna array at the second wireless device. The operations of 1610 may be performed in accordance with examples as disclosed herein. In some examples, aspects of the operations of 1610 may be performed by a feedback message receiving manager 1030 as described with reference to FIG. 10.

At 1615, the method may include transmitting a message to the second wireless device in accordance with a second precoder matrix that is modified relative to the first precoder matrix based on the estimated rotational misalignment, the estimated spatial misalignment, or both. The operations of 1615 may be performed in accordance with examples as disclosed herein. In some examples, aspects of the operations of 1615 may be performed by a message transmitting manager 1035 as described with reference to FIG. 10.

Figure 17:
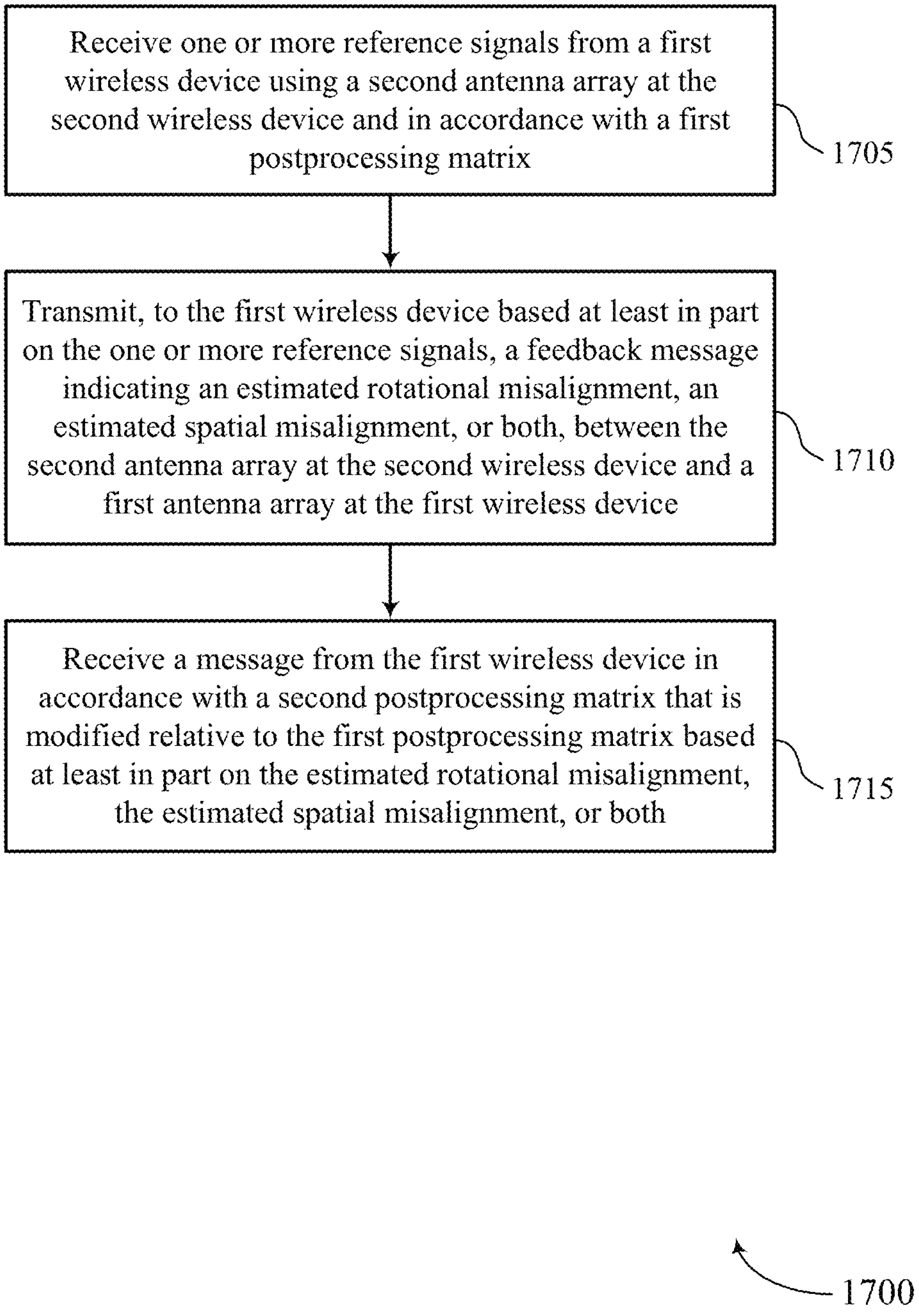

FIG. 17 shows a flowchart illustrating a method 1700 that supports techniques for estimating misalignment between antenna arrays in accordance with one or more aspects of the present disclosure. The operations of the method 1700 may be implemented by a UE or its components as described herein. For example, the operations of the method 1700 may be performed by a UE 115 as described with reference to FIGS. 1 through 7 and 12 through 15. In some examples, a UE may execute a set of instructions to control the functional elements of the UE to perform the described functions. Additionally, or alternatively, the UE may perform aspects of the described functions using special-purpose hardware.

At 1705, the method may include receiving one or more reference signals from a first wireless device using a second antenna array at the second wireless device and in accordance with a first postprocessing matrix. The operations of 1705 may be performed in accordance with examples as disclosed herein. In some examples, aspects of the operations of 1705 may be performed by a reference signal receiving manager 1425 as described with reference to FIG. 14.

At 1710, the method may include transmitting, to the first wireless device based on the one or more reference signals, a feedback message indicating an estimated rotational misalignment, an estimated spatial misalignment, or both, between the second antenna array at the second wireless device and a first antenna array at the first wireless device. The operations of 1710 may be performed in accordance with examples as disclosed herein. In some examples, aspects of the operations of 1710 may be performed by a feedback message transmitting manager 1430 as described with reference to FIG. 14.

At 1715, the method may include receiving a message from the first wireless device in accordance with a second postprocessing matrix that is modified relative to the first postprocessing matrix based on the estimated rotational misalignment, the estimated spatial misalignment, or both. The operations of 1715 may be performed in accordance with examples as disclosed herein. In some examples, aspects of the operations of 1715 may be performed by a message receiving manager 1435 as described with reference to FIG. 14.

The following provides an overview of aspects of the present disclosure:

Aspect 1: A method for wireless communication at a first wireless device, comprising: transmitting one or more reference signals to a second wireless device using a first antenna array at the first wireless device and in accordance with a first precoder matrix; receiving, from the second wireless device based at least in part on the one or more reference signals, a feedback message indicating an estimated rotational misalignment, an estimated spatial misalignment, or both, between the first antenna array at the first wireless device and a second antenna array at the second wireless device; and transmitting a message to the second wireless device in accordance with a second precoder matrix that is modified relative to the first precoder matrix based at least in part on the estimated rotational misalignment, the estimated spatial misalignment, or both.

Aspect 2: The method of aspect 1, further comprising: transmitting the one or more reference signals with a same phase across a plurality of antenna elements of the first antenna array in accordance with the first precoder matrix, wherein the estimated rotational misalignment is based at least in part on transmitting the one or more reference signals with the same phase.

Aspect 3: The method of aspect 2, wherein the estimated rotational misalignment is estimated relative to one or more axes that are perpendicular to an additional axis that extends from the first antenna array to the second antenna array.

Aspect 4: The method of any of aspects 1 through 3, further comprising: transmitting the one or more reference signals with a phase ramp across a plurality of antenna elements of the first antenna array in accordance with the first precoder matrix, wherein the estimated rotational misalignment is based at least in part on transmitting the one or more reference signals with the phase ramp.

Aspect 5: The method of aspect 4, wherein the estimated rotational misalignment is estimated relative to an axis that extends from the first antenna array to the second antenna array.

Aspect 6: The method of any of aspects 1 through 5, further comprising: transmitting a first subset of reference signals of the one or more reference signals via a first subset of antenna elements of the first antenna array, wherein the first subset of reference signals are transmitted with a first phase; and transmitting a second subset of reference signals of the one or more reference signals via a second subset of antenna elements of the first antenna array, wherein the second subset of reference signals are transmitted with a second phase that is different from the first phase, wherein the estimated spatial misalignment is based at least in part on transmitting the first subset of reference signals with the first phase and transmitting the second subset of reference signals with the second phase.

Aspect 7: The method of aspect 6, wherein the second phase comprises an opposite sign compared to the first phase.

Aspect 8: The method of any of aspects 6 through 7, wherein the estimated spatial misalignment is estimated relative to one or more axes that are perpendicular to an additional axis that extends from the first antenna array to the second antenna array.

Aspect 9: The method of any of aspects 1 through 8, further comprising: communicating a control message indicating a reference signal waveform, wherein one or more reference signals are transmitted in accordance with the reference signal waveform.

Aspect 10: The method of any of aspects 1 through 9, further comprising: receiving one or more additional reference signals from the second wireless device using the first antenna array; and transmitting, to the second wireless device based at least in part on the one or more additional reference signals, a second feedback message indicating a second estimated rotational misalignment, a second estimated spatial misalignment, or both, between the first antenna array at the first wireless device and the second antenna array at the second wireless device, wherein the second precoder matrix is modified relative to the first precoder matrix based at least in part on the second estimated rotational misalignment, the second estimated spatial misalignment, or both.

Aspect 11: The method of aspect 10, further comprising: performing measurements on the one or more additional reference signals, wherein the second estimated rotational misalignment, the second estimated spatial misalignment, or both, is based at least in part on the measurements.

Aspect 12: The method of any of aspects 10 through 11, wherein a first axis extends from the first antenna array to the second antenna array, the method further comprising: estimating a plurality of phases associated with the one or more additional reference signals along a second axis, a third axis, or both, wherein the second axis and the third axis are perpendicular to the first axis, and wherein the second estimated rotational misalignment is based at least in part on the plurality of phases.

Aspect 13: The method of any of aspects 10 through 12, further comprising: comparing the one or more additional reference signals with a reference signal waveform, wherein the second estimated rotational misalignment, the second estimated spatial misalignment, or both, is based at least in part on the comparing.

Aspect 14: The method of any of aspects 1 through 13, further comprising: determining a channel estimation matrix associated with a channel between the first antenna array and the second antenna array based at least in part on the estimated rotational misalignment, an estimated spatial misalignment, or both, wherein the second precoder matrix is modified relative to the first precoder matrix based at least in part on the channel estimation matrix.

Aspect 15: The method of any of aspects 1 through 14, wherein the estimated spatial misalignment comprises a parallel shift misalignment along one or more axes relative to the first antenna array, the second antenna array, or both.

Aspect 16: A method for wireless communication at a second wireless device, comprising: receiving one or more reference signals from a first wireless device using a second antenna array at the second wireless device and in accordance with a first postprocessing matrix; transmitting, to the first wireless device based at least in part on the one or more reference signals, a feedback message indicating an estimated rotational misalignment, an estimated spatial misalignment, or both, between the second antenna array at the second wireless device and a first antenna array at the first wireless device; and receiving a message from the first wireless device in accordance with a second postprocessing matrix that is modified relative to the first postprocessing matrix based at least in part on the estimated rotational misalignment, the estimated spatial misalignment, or both.

Aspect 17: The method of aspect 16, wherein the estimated rotational misalignment is estimated relative to one or more axes that are perpendicular to an additional axis that extends from the first antenna array to the second antenna array.

Aspect 18: The method of any of aspects 16 through 17, wherein the estimated rotational misalignment is estimated relative to an axis that extends from the first antenna array to the second antenna array.

Aspect 19: The method of any of aspects 16 through 18, wherein the estimated spatial misalignment is estimated relative to one or more axes that are perpendicular to an additional axis that extends from the first antenna array to the second antenna array.

Aspect 20: The method of any of aspects 16 through 19, further comprising: communicating a control message indicating a reference signal waveform, wherein one or more reference signals are communicated in accordance with the reference signal waveform.

Aspect 21: The method of any of aspects 16 through 20, further comprising: transmitting one or more additional reference signals to the first wireless device using the second antenna array; and receiving, from the first wireless device based at least in part on the one or more additional reference signals, a second feedback message indicating a second estimated rotational misalignment, a second estimated spatial misalignment, or both, between the first antenna array at the first wireless device and the second antenna array at the second wireless device, wherein the second postprocessing matrix is modified relative to the first postprocessing matrix based at least in part on the second estimated rotational misalignment, the second estimated spatial misalignment, or both.

Aspect 22: The method of any of aspects 16 through 21, further comprising: performing measurements on the one or more reference signals, wherein the estimated rotational misalignment, the estimated spatial misalignment, or both, is based at least in part on the measurements.

Aspect 23: The method of any of aspects 16 through 22, wherein a first axis extends from the first antenna array to the second antenna array, the method further comprising: estimating a plurality of phases associated with the one or more reference signals along a second axis, a third axis, or both, wherein the second axis and the third axis are perpendicular to the first axis, and wherein the estimated rotational misalignment is based at least in part on the plurality of phases.

Aspect 24: The method of any of aspects 16 through 23, further comprising: comparing the one or more reference signals with a reference signal waveform, wherein the estimated rotational misalignment, the estimated spatial misalignment, or both, is based at least in part on the comparing.

Aspect 25: The method of any of aspects 16 through 24, further comprising: determining a channel estimation matrix associated with a channel between the first antenna array and the second antenna array based at least in part on the estimated rotational misalignment, an estimated spatial misalignment, or both, wherein the second postprocessing matrix is modified relative to the first postprocessing matrix based at least in part on the channel estimation matrix.

Aspect 26: The method of any of aspects 16 through 25, wherein the estimated spatial misalignment comprises a parallel shift misalignment along one or more axes relative to the first antenna array, the second antenna array, or both.

Aspect 27: An apparatus comprising a processor; memory coupled with the processor; and instructions stored in the memory and executable by the processor to cause the apparatus to perform a method of any of aspects 1 through 15.

Aspect 28: An apparatus comprising at least one means for performing a method of any of aspects 1 through 15.

Aspect 29: A non-transitory computer-readable medium storing code the code comprising instructions executable by a processor to perform a method of any of aspects 1 through 15.

Aspect 30: An apparatus comprising a processor; memory coupled with the processor; and instructions stored in the memory and executable by the processor to cause the apparatus to perform a method of any of aspects 16 through 26.

Aspect 31: An apparatus comprising at least one means for performing a method of any of aspects 16 through 26.

Aspect 32: A non-transitory computer-readable medium storing code the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
- one or more processors;
- one or more memories coupled with the one or more processors; and
- instructions stored in the one or more memories and executable by the one or more processors to cause the apparatus to:
  - transmit a signal to a second wireless device using a first antenna array at the first wireless device and in accordance with a first precoder matrix;
  - receive, from the second wireless device based at least in part on the signal, a feedback message indicating an estimated rotational misalignment, an estimated spatial misalignment, or both, between the first antenna array at the first wireless device and a second antenna array at the second wireless device; and
  - transmit a message to the second wireless device in accordance with a second precoder matrix that is modified relative to the first precoder matrix based at least in part on the estimated rotational misalignment, the estimated spatial misalignment, or both.

2. The apparatus of claim 1, wherein the instructions to transmit the signal are further executable by the one or more processors to cause the apparatus to:
- transmit one or more signals with a same phase across a plurality of antenna elements of the first antenna array in accordance with the first precoder matrix, wherein the estimated rotational misalignment is based at least in part on transmission of the one or more signals with the same phase.

3. The apparatus of claim 2, wherein the estimated rotational misalignment is estimated relative to one or more axes that are perpendicular to an additional axis that extends from the first antenna array to the second antenna array.

4. The apparatus of claim 1, wherein the instructions to transmit the signal are further executable by the one or more processors to cause the apparatus to:

transmit one or more signals with a phase ramp across a plurality of antenna elements of the first antenna array in accordance with the first precoder matrix, wherein the estimated rotational misalignment is based at least in part on transmission of the one or more signals with the phase ramp.

5. The apparatus of claim 4, wherein the estimated rotational misalignment is estimated relative to an axis that extends from the first antenna array to the second antenna array.

6. The apparatus of claim 1, wherein the instructions to transmit the signal are further executable by the one or more processors to cause the apparatus to:

transmit a first subset of signals via a first subset of antenna elements of the first antenna array, wherein the first subset of signals are transmitted with a first phase; and transmit a second subset of signals via a second subset of antenna elements of the first antenna array, wherein the second subset of signals are transmitted with a second phase that is different from the first phase, wherein the estimated spatial misalignment is based at least in part on transmission of the first subset of signals with the first phase and transmission of the second subset of signals with the second phase.

7. The apparatus of claim 6, wherein the second phase comprises an opposite sign compared to the first phase.

8. The apparatus of claim 6, wherein the estimated spatial misalignment is estimated relative to one or more axes that are perpendicular to an additional axis that extends from the first antenna array to the second antenna array.

9. The apparatus of claim 1, wherein the instructions are further executable by the one or more processors to cause the apparatus to:

communicate a control message indicating a defined signal waveform, wherein one or more signals are transmitted in accordance with the defined signal waveform.

10. The apparatus of claim 1, wherein the instructions are further executable by the one or more processors to cause the apparatus to:

receive one or more additional signals from the second wireless device using the first antenna array; and transmit, to the second wireless device based at least in part on the one or more additional signals, a second feedback message indicating a second estimated rotational misalignment, a second estimated spatial misalignment, or both, between the first antenna array at the first wireless device and the second antenna array at the second wireless device, wherein the second precoder matrix is modified relative to the first precoder matrix based at least in part on the second estimated rotational misalignment, the second estimated spatial misalignment, or both.

11. The apparatus of claim 10, wherein the instructions are further executable by the one or more processors to cause the apparatus to:

perform measurements on the one or more additional signals, wherein the second estimated rotational misalignment, the second estimated spatial misalignment, or both, is based at least in part on the measurements.

12. The apparatus of claim 10, wherein a first axis extends from the first antenna array to the second antenna array, wherein the instructions are further executable by the processors to cause the apparatus to:

estimate a plurality of phases associated with the one or more additional signals along a second axis, a third axis, or both, wherein the second axis and the third axis are perpendicular to the first axis, and wherein the second estimated rotational misalignment is based at least in part on the plurality of phases.

13. The apparatus of claim 10, wherein the instructions are further executable by the one or more processors to cause the apparatus to:

compare the one or more additional signals with a defined signal waveform, wherein the second estimated rotational misalignment, the second estimated spatial misalignment, or both, is based at least in part on the comparing.

14. The apparatus of claim 1, wherein the instructions are further executable by the one or more processors to cause the apparatus to:

determine a channel estimation matrix associated with a channel between the first antenna array and the second antenna array based at least in part on the estimated rotational misalignment, an estimated spatial misalignment, or both, wherein the second precoder matrix is modified relative to the first precoder matrix based at least in part on the channel estimation matrix.

15. The apparatus of claim 1, wherein the estimated spatial misalignment comprises a parallel shift misalignment along one or more axes relative to the first antenna array, the second antenna array, or both.

16. An apparatus for wireless communication at a second wireless device, comprising:

one or more processors;

one or more memories coupled with the one or more processors; and instructions stored in the one or more memories and executable by the one or more processors to cause the apparatus to:

receive a signal from a first wireless device using a second antenna array at the second wireless device and in accordance with a first postprocessing matrix;

transmit, to the first wireless device based at least in part on the signal, a feedback message indicating an estimated rotational misalignment, an estimated spatial misalignment, or both, between the second antenna array at the second wireless device and a first antenna array at the first wireless device; and receive a message from the first wireless device in accordance with a second postprocessing matrix that is modified relative to the first postprocessing matrix based at least in part on the estimated rotational misalignment, the estimated spatial misalignment, or both.

17. The apparatus of claim 16, wherein the estimated rotational misalignment is estimated relative to one or more axes that are perpendicular to an additional axis that extends from the first antenna array to the second antenna array.

18. The apparatus of claim 16, wherein the estimated rotational misalignment is estimated relative to an axis that extends from the first antenna array to the second antenna array.

19. The apparatus of claim 16, wherein the estimated spatial misalignment is estimated relative to one or more axes that are perpendicular to an additional axis that extends from the first antenna array to the second antenna array.

20. The apparatus of claim 16, wherein the instructions are further executable by the one or more processors to cause the apparatus to:

communicate a control message indicating a defined signal waveform, wherein one or more signals are communicated in accordance with the defined signal waveform.

21. The apparatus of claim 16, wherein the instructions are further executable by the one or more processors to cause the apparatus to:

transmit one or more additional signals to the first wireless device using the second antenna array; and receive, from the first wireless device based at least in part on the one or more additional signals, a second feedback message indicating a second estimated rotational misalignment, a second estimated spatial misalignment, or both, between the first antenna array at the first wireless device and the second antenna array at the second wireless device, wherein the second postprocessing matrix is modified relative to the first postprocessing matrix based at least in part on the second estimated rotational misalignment, the second estimated spatial misalignment, or both.

22. The apparatus of claim 16, wherein the instructions are further executable by the one or more processors to cause the apparatus to:

perform measurements on the signal, wherein the estimated rotational misalignment, the estimated spatial misalignment, or both, is based at least in part on the measurements.

23. The apparatus of claim 16, wherein a first axis extends from the first antenna array to the second antenna array, wherein the instructions are further executable by the one or more processors to cause the apparatus to:

estimate a plurality of phases associated with the signal along a second axis, a third axis, or both, wherein the second axis and the third axis are perpendicular to the first axis, and wherein the estimated rotational misalignment is based at least in part on the plurality of phases.

24. The apparatus of claim 16, wherein the instructions are further executable by the one or more processors to cause the apparatus to:

compare the signal with a defined signal waveform, wherein the estimated rotational misalignment, the estimated spatial misalignment, or both, is based at least in part on the comparing.

25. The apparatus of claim 16, wherein the instructions are further executable by the one or more processors to cause the apparatus to:

determine a channel estimation matrix associated with a channel between the first antenna array and the second antenna array based at least in part on the estimated rotational misalignment, an estimated spatial misalignment, or both, wherein the second postprocessing matrix is modified relative to the first postprocessing matrix based at least in part on the channel estimation matrix.

26. The apparatus of claim 16, wherein the estimated spatial misalignment comprises a parallel shift misalignment along one or more axes relative to the first antenna array, the second antenna array, or both.

27. A method for wireless communication at a first wireless device, comprising:

transmitting a signal to a second wireless device using a first antenna array at the first wireless device and in accordance with a first precoder matrix;

receiving, from the second wireless device based at least in part on the signal, a feedback message indicating an estimated rotational misalignment, an estimated spatial misalignment, or both, between the first antenna array at the first wireless device and a second antenna array at the second wireless device; and transmitting a message to the second wireless device in accordance with a second precoder matrix that is modified relative to the first precoder matrix based at least in part on the estimated rotational misalignment, the estimated spatial misalignment, or both.

28. The method of claim 27, wherein transmitting the signal further comprises:

transmitting one or more signals with a same phase across a plurality of antenna elements of the first antenna array in accordance with the first precoder matrix, wherein the estimated rotational misalignment is based at least in part on transmitting the one or more signals with the same phase.

29. A method for wireless communication at a second wireless device, comprising:

receiving a signal from a first wireless device using a second antenna array at the second wireless device and in accordance with a first postprocessing matrix;

transmitting, to the first wireless device based at least in part on the signal, a feedback message indicating an estimated rotational misalignment, an estimated spatial misalignment, or both, between the second antenna array at the second wireless device and a first antenna array at the first wireless device; and receiving a message from the first wireless device in accordance with a second postprocessing matrix that is modified relative to the first postprocessing matrix based at least in part on the estimated rotational misalignment, the estimated spatial misalignment, or both.

30. The method of claim 29, wherein the estimated rotational misalignment is estimated relative to one or more axes that are perpendicular to an additional axis that extends from the first antenna array to the second antenna array.

* * * * *